United States Patent [19]

Burke et al.

[11] Patent Number: 4,468,813
[45] Date of Patent: Aug. 28, 1984

[54] DIGITAL VOICE STORAGE SYSTEM

[75] Inventors: Timothy M. Burke, Fort Worth; Paul F. Smith, N. Richland Hills; Scott W. Noble; Eric R. Schorman, both of Bedford, all of Tex.

[73] Assignee: Motorola, Inc., Schaumburg, Ill.

[21] Appl. No.: 446,890

[22] Filed: Dec. 6, 1982

[51] Int. Cl.³ .......................... H04B 7/26; G10L 1/08
[52] U.S. Cl. .................................. 455/38; 179/2 EB; 179/18 B; 340/825.52; 340/825.55; 370/93; 455/54
[58] Field of Search ............... 179/2 E, 2 EA, 2 EB, 179/2 EC, 18 B, 18 BF; 340/825.44, 825.45, 825.48, 825.52, 825.54, 825.55; 360/32; 370/61, 92, 93, 96; 381/36, 40, 41, 43; 455/38, 53, 54, 56

[56] References Cited

U.S. PATENT DOCUMENTS

| | | | |
|---|---|---|---|
| 3,281,789 | 10/1966 | Wilcox et al. | 455/54 |
| 3,641,496 | 2/1972 | Slavin . | |
| 3,694,811 | 9/1972 | Wood . | |
| 3,706,929 | 12/1972 | Robinson et al. . | |
| 3,710,313 | 1/1973 | Kimball et al. | 340/33 |
| 3,803,358 | 4/1974 | Schirf et al. . | |
| 3,808,591 | 4/1974 | Panicello et al. | 340/27 R |
| 3,846,783 | 11/1974 | Apsell et al. . | |
| 3,996,554 | 12/1976 | Ives et al. | 340/33 |
| 4,060,848 | 11/1977 | Hyatt | 364/200 |
| 4,117,263 | 9/1978 | Yeh . | |
| 4,131,849 | 12/1978 | Freeburg et al. . | |
| 4,181,813 | 1/1980 | Marley . | |
| 4,182,989 | 1/1980 | Endó et al. | 455/56 |
| 4,209,836 | 6/1980 | Wiggins, Jr. et al. | 364/718 |
| 4,232,390 | 11/1980 | McEvilly, Jr. | 455/77 |
| 4,247,947 | 1/1981 | Miyamoto | 455/38 |
| 4,255,618 | 3/1981 | Danner et al. . | |
| 4,330,780 | 5/1982 | Masaki | 340/825.44 |

FOREIGN PATENT DOCUMENTS 55-137739 10/1980 Japan ..................................... 455/54

OTHER PUBLICATIONS

"Design of a Multi-Service Subscriber Loop System'-'-Tsuda et al., NTG-Fachber, vol. 73, 1980, pp. 114-118.
"Series 1600 Solid State Voice Storage Unit" Publication by RACOM Out of the Mobile Times/Jun. 1980.
Motorola Catalog Insert–"Portable Receiver/Recorder" Sec. 8.6 Item #01, (From Motorola Equipment Catalog R3).
"RESCU" Emergency Location Alerting System–A product of The Antenna Specialists Co.
"Bosch Technische Information" German Publication (EK-VKD 8 699921059) (040/5).

Primary Examiner—Marc E. Bookbinder
Attorney, Agent, or Firm—F. John Motsinger; James W. Gillman; Edward M. Roney

[57] ABSTRACT

A digital voice storage system adapted for use in a multiple unit land mobile radio communications system. The system utilizes a PSK signalling system with fixed length data packets to control a system capable of multiple message storage of speech at mobile stations. Up to eight 64K dynamic RAMS are used in conjunction with a microprocessor to store up to 42 seconds of speech comprising up to eight separate messages. In addition, the system permits base interrogation of mobiles to determine if a message has been stored for review by the base operator and to determine the remaining recording capacity and total recording capacity of the mobile.

9 Claims, 18 Drawing Figures

DIGITAL VOICE STORAGE SYSTEM

BACKGROUND OF THE INVENTION

1. Field of the Invention

This invention relates generally to voice/data communications systems and in particular to apparatus and techniques for a digital voice storage and retrieval system adapted for use in a multi-unit land mobile radio communications system.

2. Description of the Prior Art

The prior art includes various types of radio frequency transmission systems of the general type which serve to effect a selective transmission from or to an emergency vehicle or purposes of generating a warning transmission. Conventional systems typically utilize magnetic tape or wire for the storage of the desired message and utilize conventional playback arrangements. However, use of such conventional systems in many applications present substantial difficulties due to the environment, weight, and size limitations imposed by such applications. In addition, automatic record and playback devices are known in the prior art, such as with telephone answering systems, that answer with recorded instructions on a first magnetic tape, then record a telephone message on a second magnetic tape. Somewhat similar systems for recording a received message at a mobile or pre-recording a message to be transmitted in response to remote activation, are utilized in multi-unit mobile radio communications systems. These electromechanical systems are typically bulky, unreliable, and inflexible. Also, these prior art arrangements only provide sequential access for generating fixed messages. Therefore, many potential applications have not been feasible in the prior art due to the limitations of these systems.

SUMMARY OF THE INVENTION

It is therefore an object of the invention to provide a solid state voice storage system utilizing digital voice storage and adapted for use in a multi-unit land mobile communications system.

It is another object of the invention to provide a voice storage system capable of multiple message storage and non-sequential access.

It is yet another object of the invention to provide a voice storage system for a multiple unit land mobile communications system with selective base-to-mobile recording.

It is still another object of the invention to provide a voice storage system for multiple unit land mobile communications systems wherein the base includes the capability of interrogating the mobile status to determine if a message is recorded for the base or to determine the mobile's remaining recording capacity.

Briefly, according to the invention, a digital voice storage system adapted for voice and data communications systems is provided. The communications system includes at least one primary station and a plurality of remote stations with all stations adapted to transmit a command data packet, and each remote station having a predetermined station address stored in a station address register. The digital voice storage system includes at each secondary station, circuitry for generating a record activation signal in response to receiving a command data packet having a record code and an address corresponding predetermined station address of the station. In addition, each secondary station includes circuitry for analog to digital conversion of voice messages transmitted by the primary station and received by the secondary station, and for storing the converted message in a digital memory. Each secondary station further includes circuitry for terminating the analog to digital conversion and storing operations in response to a termination signal. The primary station comprises circuitry for transmitting a command data packet containing a record code and a station address and circuitry for transmitting a voice message to the secondary station and a termination code subsequent to the completion of the message.

BRIEF DESCRIPTION OF THE DRAWINGS

The features of the present invention which are believed to be novel are set forth with particularity in the appended claims. The invention, together with further objects and advantages thereof, may best be understood by reference to the following description when taken in conjunction with the accompanying drawings.

BRIEF DESCRIPTION OF THE PREFERRED EMBODIMENT

Figure 1:
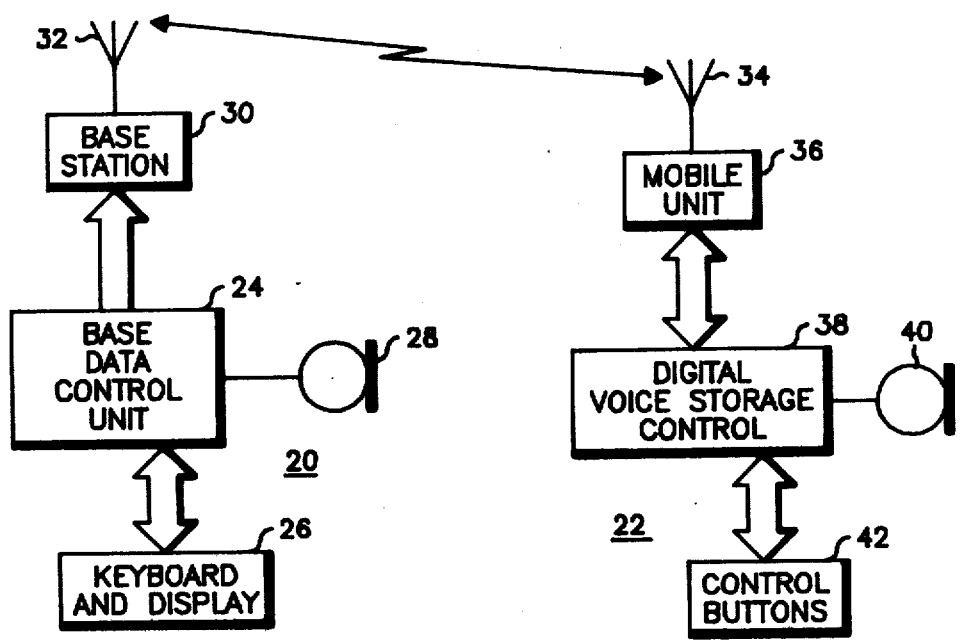
FIG. 1 is a block diagram of a radio communications system incorporating a digital voice storage system according to the invention.

In FIG. 1, there is shown a block diagram of a radio communications system that utilizes both data signals and voice signals between a primary (base) station 20 and at least one secondary (mobile) station 22. The radio system illustrated also incorporates the novel digital voice storage system of the invention. The system is processor based such that all of the control operations and signalling are performed in software, allowing a portable and modular system. Such a voice/data communications system is disclosed in detail in co-pending application bearing Ser. No. 402,687, filed July 28, 1982 by Timothy Burke, and assigned to Motorola, Inc. The system illustrated includes a base data control unit 24 identical to that disclosed in tbe above-mentioned co-pending application with some software modifications to be desribed hereinafter. The base data control unit 24 includes a keypad and display 26 to permit operator control and monitoring of functions, and a microphone 28 or voice input. The base data control unit 24 is coupled as shown to a base transceiver 30 which includes an antenna 32. Either voice communications or data communications are established with the mobile station via RF transmission. The mobile station illustrated includes an antenna 34 coupled to a mobile transceiver 36 which is coupled to a mobile unit digital voice storage control circuit 38. The mobile digital voice storage unit 38 includes a microphone 40 and a set of control buttons 42 to permit the operator to control the digital voice storage functions.

The signalling used is a 600 bit per second PSK modulation signal with a 1500 hertz carrier. Data transfers are accomplished in packets of 32 bits that are synchronized through a 40 bit, dual phase optimized code word. A rate one-half convolution threshold decoder is used for error correction and a 16 bit inverted-CCITT cyclical redundancy code is used for message error detection. The command packets contain status information, commands, and address information corresponding to a particular mobile unit.

Figure 2:
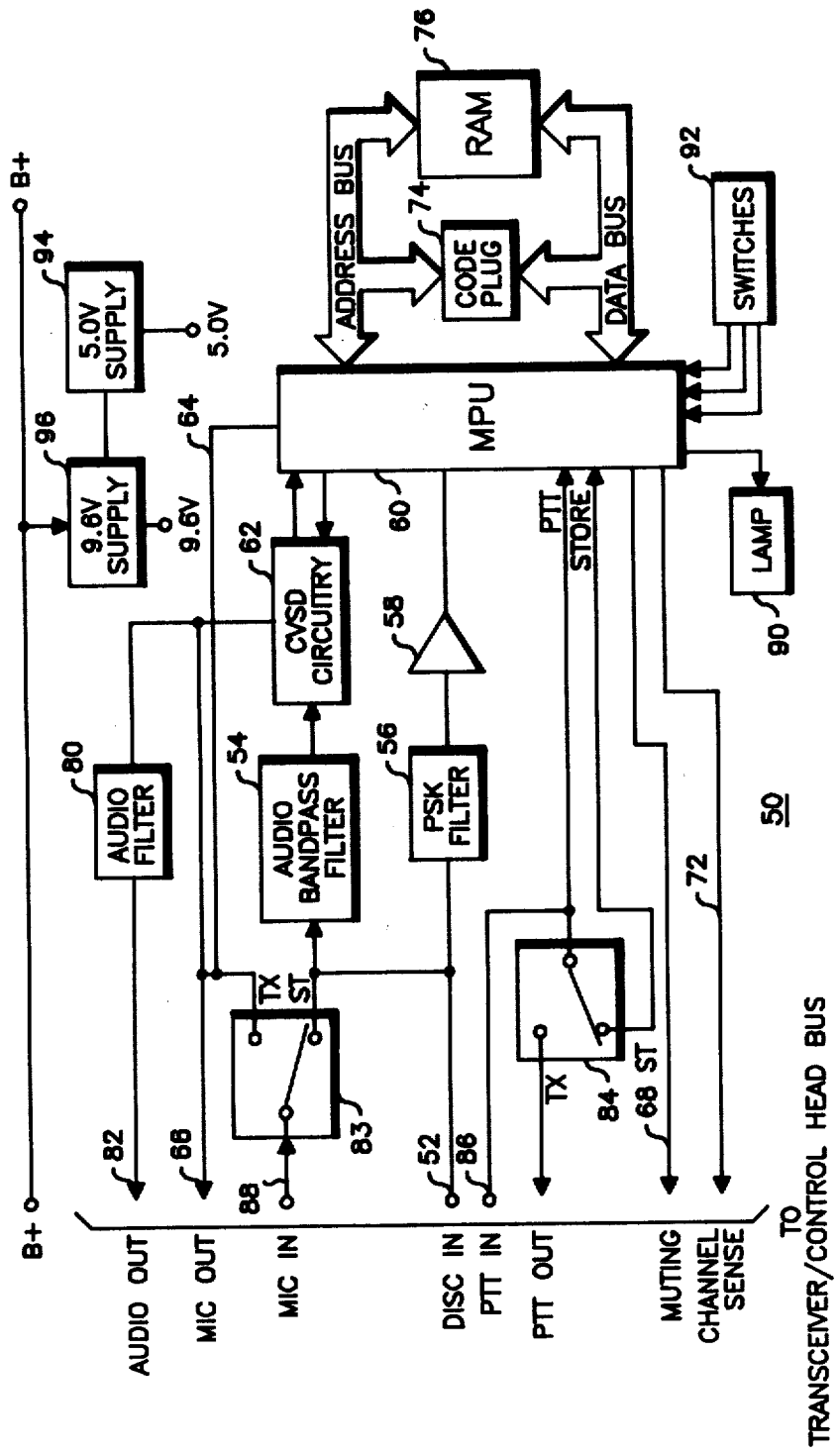
FIG. 2 is a block diagram of the mobile digital voice storage control circuit according to the invention.

Referring now to FIG. 2, there is shown a block diagram of the mobile digital voice storage control unit according to the invention for use in conjunction with a mobile transceiver as illustrated in FIG. 1. The mobile unit 50 consists primarily of a microcomputer 60 (e.g., in the preferred embodiment a Motorola MC3870), up to eight 64K dynamic random access memories (e.g., a Motorola MCM6664) and supporting digital and analog circuitry. The unit can store up to 42 seconds of speech, comprising up to 8 unique messages. The processor 60 performs all of the PSK modulation, demodulation, encoding and decoding of the signalling, and all the control and management functions of the mobile system.

Incoming data is applied from a receiver detector (not shown) in analog form to the discriminator input 52, and then coupled, as shown, to an audio bandpass filter 54 and PSK bandpass filter 56. The PSK filter 56 removes unwanted signals and receiver noise, and couples the filtered signal to a limiter 58 where the signal is limited, and then coupled to the MPU 60 for processing and decoding. The microprocessor 60 performs coherent detection of the PSK signal recovering the command data packets which provide the command and control information for the mobile unit 50. The audio bandpass filter 54 filters audio voice signals and couples the filtered speech signal to a continuously variable slope delta modulation (CVSD) encoder/decoder circuit 62 which, in conjunction with the MPU 60 digitizes the incoming speech signal. This circuit is also used to reconstruct speech on playback. (at a sample rate of 12.346 kilohertz in the preferred embodiment).

Data to be transmitted is prepared in the MPU 60 in command data packets and coupled as PSK modulated packets from the output 64 to the microphone output 66, to the radio transmitter. The microphone (not shown) is muted during data transmission to prevent any voice interference. Radio muting is controlled by the MPU 60 via the output 68, and tone generation is performed by the MPU 60 in conjunction with CVSD circuit 62 and the filter 80, and coupled to the audio output 82, and to microphone output 66, as shown. Channel sensing is also performed by the MPU 60 via the conductor 72. A code plug 74 is coupled, as shown, to the MPU 60, and contains all of the system information on selected options of the digital voice storage unit 50. The data in the code plug 74 is read by the MPU 60 and then used in the control of the operation of the mobile digital voice storage unit 50. A random access memory (RAM) 76 is also coupled to the MPU 60, as shown, composed of up to eight dynamic 64K RAMS to provide storage for up to 42 seconds of digital voice storage. An audio filter 80 is coupled to the CVSD circuit 62 to provide smoothing of the reconstructed speech from the CVSD circuit 62 and the resulting smooth speech signal is coupled to the output 82, as shown. A microphone switch 83, which is part of a STORE function switch, is provided to couple speech from the microphone input 88 to the audio bandpass filter 54 during the storing of speech, and to couple speech to the transmitter (not shown) during transmission. In addition, a switch 84 couples the PTT signal to the MPU 60 from the input 86 during storage of speech, while coupling the PTT signal to the transceiver/control head bus (see FIG. 1) during transmission. A message indicator lamp 90 is coupled to the MPU, as shown, to provide an indication of a stored message to the operator. A set of three switches 92 is also coupled to the MPU 60 to permit the operator to select PLAY, REPLAY, and SEND modes of the digital voice storage operation. The mobile digital voice storage unit 50 also requires a regulated five volt power supply 94 and a regulated 9.6 volt power supply 96, as shown.

The mobile digital voice storage memory is organized in blocks of approximately 166 milliseconds of recorded speech in the preferred embodiment in order to increase addressing speed. In addition, messages are stored in a first in first out (FIFO) queue. To do this without moving large amounts of data in the microprocessor 60, a circular message table is utilized with pointers and lags and with eight addresses to permit eight separate messages. One pointer points at all time to the location in the message table of the most recent message. In addition, three flags are used to indicate the status of each message. These flags are labeled PRESNT, ACTIVE, and STFWD to represent present, active, and store and forward messages. A message is present as long as it is intact in the voice memory. A normally recorded message from the base is active (and present) until it is reviewed by the mobile at which time it is present only. A message is present, and store and forward (STFWD) if it is recorded by the mobile operator to be forwarded to the base.

When a record command is received, the PRESNT flag is examined. If no messages are present, the start address for the recording is set to the beginning of the RAM, but if other messages are present, the new message ill be recorded starting at the end of the most recent message. Once the recording stops, the start and stop addresses are placed in the message table and flags are reset for overwritten messages. If a message is partially overwritten, the start address for the message is adjusted to the new message stop address.

In general, a new message is allowed to overwrite all prior messages. An exception is made in the case of store and forward messages originated by the mobile operator. It is necessary to prevent a mobile operator from destroying base originated messages which he has not yet reviewed. If the mobile's message lamp 90 is on, indicating that one or more messages has not been reviewed, the operator will not be allowed to create a store and forward message. If he activates the store mode, beeps will sound until he releases the store button. If he does not release the store button, the beeps will stop after 15 seconds, but will restart if the PTT is pushed, and no recording will be permitted until the base message has been reviewed. The store mode allows the operator to append speech segments to longer messages by using the PTT to start and stop the recording. After the PTT is released, the message is played back automatically. If the mobile operator creates a stored message that fills the voice memory, beeps will sound until the PTT is released at which time the entire message will be played back. If the operator depresses the PTT again, with the store button still pushed, the entire store and forward message will be erased. This provides a convenient method for erasing a store and forward message.

In operation, a base initiated voice storage sequence begins with the base transmission of a command packet including command and address information identifying the mobile unit or units called depending upon whether the address indicates a unit, group or fleet. The base may, optionally, determine the time remaining for the storage and the total storage time by transmitting the appropriate command packet. To store a message with the recorder, the operator sends a command data packet instructing the mobile unit to record the transmission, and then proceeds to talk normally. Upon receiving the record instruction, the mobile unit starts an analog to digital conversion and stores the converted data in the RAM. While recording, the mobile digital voice storage unit does not have time to decode a stop command packet. Thus, a turn off code (at 1543 hertz in the preferred embodiment) is transmitted by the base station when the operator releases the PTT, which is detected by the mobile digital voice storage unit terminating the recording. To let the mobile operator know that a message is waiting to be reviewed, a message light 90 is turned on at the mobile unit. The light goes out when the last message is reviewed by the mobile operator.

The mobile operator can review the recorded message, as well as all messages recorded before or after it. A PLAY switch, which is a momentary switch, will allow the user to sequence through the messages stored, and play them through the normal receive audio. If several messages were recorded, the first press of the switch will play the oldest message first. Pressing the switch again will play the next message, and so forth until all messages have been reviewed. When the last message is played, a short beep will be generated. If the operator depresses the switch again, the sequence starts over. A replay switch, also a momentary switch, allows the operator to replay the last message played back. If no message was played since the last recording, the oldest present message will be played.

The mobile operator can locally store a message by depressing a locking STORE switch which puts the unit in the store-forward mode. This allows the operator to compose a message which may later be optionally retrieved by the base station. When the switch is in the normal position, the microphone operates the transmitter in a normal manner. In the STORE position, the operator starts to record a message by depressing the PTT on the microphone. When he releases the PTT, his message is played back through the radio audio. Each time the PTT is depressed, the operator can append onto his existing message and each time the PTT is released, the recorder plays back his entire message.

A SEND switch, also a momentary switch, is provided to permit the operator to send a command data packet to the base informing the base that a store forward message has been recorded and may be retrieved by the base operator. The command data packet will only be sent if a store forward message is present in the mobile memory.

The base operator can transmit a command data packet requesting the status of the mobile DVS unit, to obtain time remaining on the recorder and also whether there is a message waiting. If there is a message waiting, a command data packet may be sent to the mobile instructing it to transmit the message. Thus, even if the mobile operator has left the vehicle, the base operator can hear what the mobile operator recorded before he left. An additional feature allows the mobile operator to remotely trigger a special emergency status for his mobile using a portable radio. A portable radio can be used to send a command data packet to the mobile which causes the mobile to transmit a priority status command data packet to the base. The base can then transmit a command data packet to request that the mobile stored message be transmitted.

Figure 3:
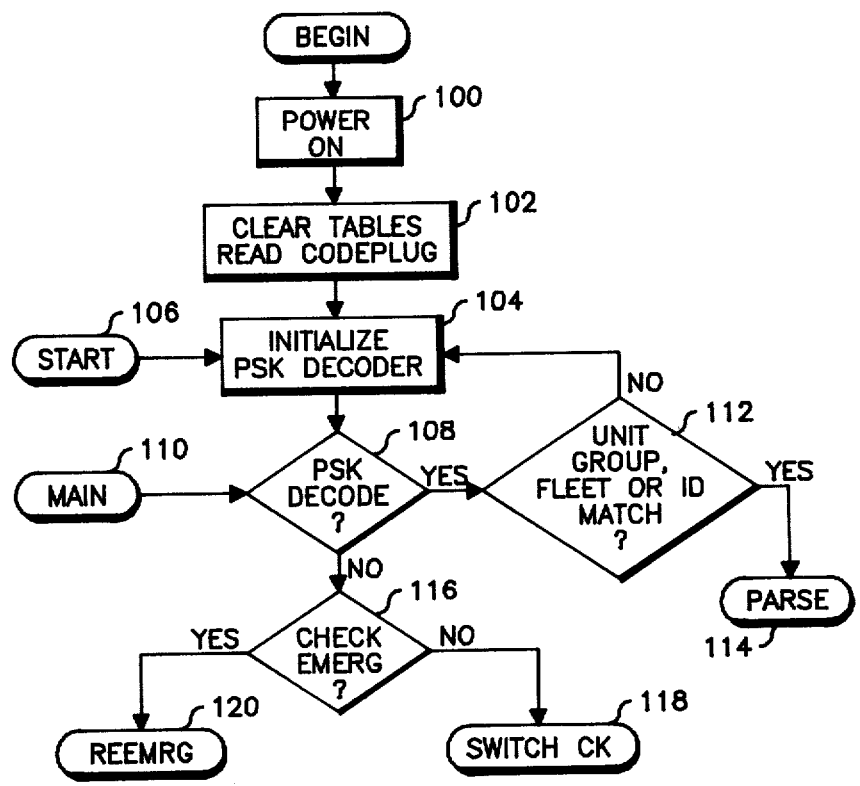
FIG. 3 is a flow diagram of the BEGIN routine of the mobile unit computer program for the invention.

Referring now to FIG. 3, there is shown a flow diagram of the BEGIN routine of the mobile unit computer program for the microcomputer 60 of FIG. 2 for implementing the invention. The program is entered at block 100 upon power on and initialization occurs at block 102 including clearing of tables and reading of system data from the code plug. Program flow then proceeds to block 104 where the PSK decoder is initialized. The PSK initialization block 104 may also be entered from the entry point START shown at 106. Program flow then proceeds to block 108 to the PSK decoder routine. This routine may also be entered from the entry point MAIN as shown at 110. The PSK decoder program is described in detail in the previously referenced co-pending application. If, in the PSK decode routine, a decode of a data packet has occurred, program flow proceeds to block 112 to test for the proper ID match. If the proper ID match occurs, program flow will proceed to the PARSE routine as shown at 114 and if no match occurs then the program flow returns to the PSK initialization at 104. If no decode of a valid command data packet can be made, then the program flow will proceed to block 116 to check to determine if it is necessary to perform a re-transmission of the emergency status. If so, the program flow proceeds as shown to the REEMERG routine as indicated at 120 and if not, the program flow will proceed to the SWITCH CK routine as indicated at 118.

Figure 4:
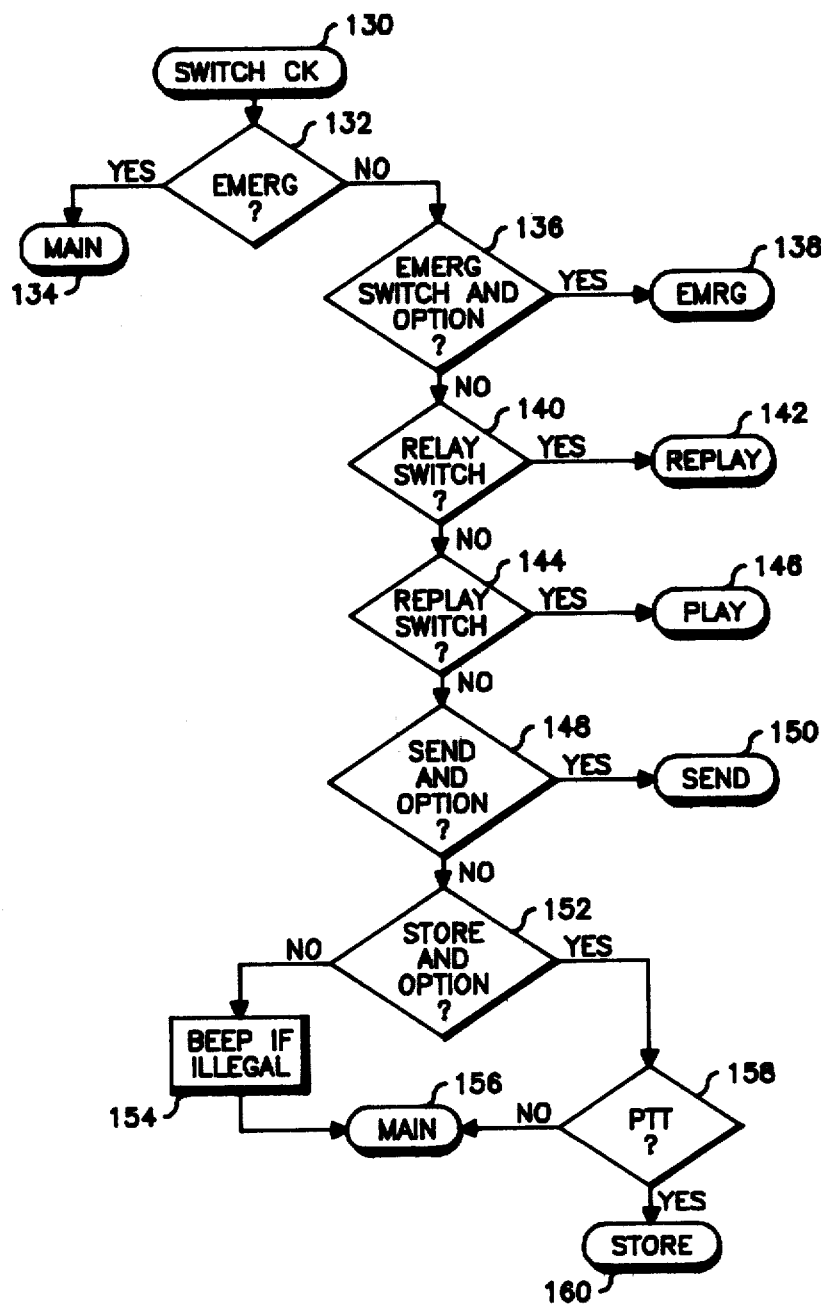
FIG. 4 is a flow diagram of the SWITCH CK routine of the mobile unit computer program for the invention.

A flow diagram of the SWITCH CK routine is shown in FIG. 4, which shows entry to the routine at block 130. At block 132, a check is made to determine if the system is in the emergency mode and if so, program flow proceeds to the MAIN entry point of FIG. 3 as indicated at 134 and if not, another test is made at block 136. As indicated at block 136, the emergency switch is checked to determine if a new emergency mode has just been initiated and if the emergency mode option exists. If the result is true, program control is transferred to the EMRG routine as indicated at 138 and if not, the program flow proceeds to block 140. At block 140, the replay switch is checked to determine if it has been activated and if so, program control will be transferred to the REPLAY routine as indicated at 142. If not, program flow proceeds to block 144 where the play switch is tested to determine if it has been activated. If so, the program control is transferred to the PLAY routine as indicated at 146 and if not, program flow proceeds to block 148. At block 148 the send switch is checked to determine if it has been activated and if the send option is available. If the result is positive the program control is transferred to the routine SEND as indicated at 150. If not, program flow proceeds to block 152 where the STORE switch is checked to determine if it has been pressed and the code plug is checked to determine if the store option is available. If the result is negative, program flow proceeds to block 154 where the beeps are sounded if an illegal operation has been attempted and then program control will be transferred to the MAIN entry point of FIG. 3 as indicated at block 156. However, if the result at block 152 is positive, the program flow proceeds to block 158 where the push to talk switch is checked to see if it has been activated, if not, the program control is transferred to the MAIN entry point of FIG. 3 as indicated at 156. If the PTT switch has been activated, the program control is transferred to the STORE routine, as indicated at block 160.

Figure 5:
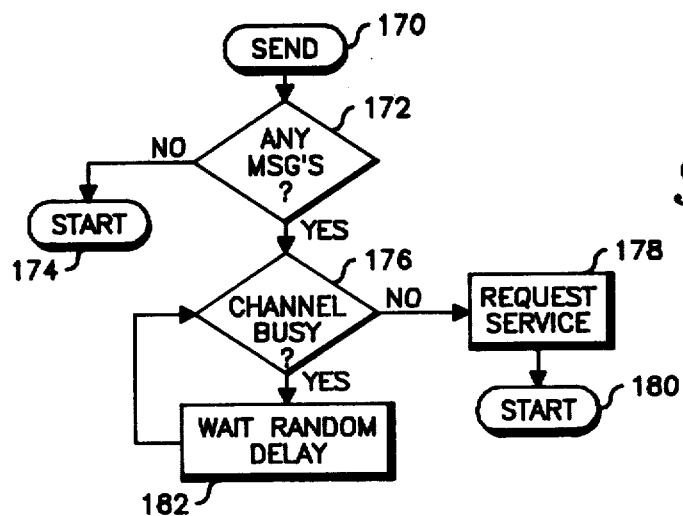
FIG. 5 is a flow diagram of the SEND routine of the mobile unit computer program for the invention.

The SEND routine is illustrated in FIG. 5 and, as shown, is entered at block 170. Program flow proceeds immediately to block 172 to test to determine if there is any store and forward message present. If the result is no, program control is transferred to the START entry point shown in FIG. 3 and if the result is yes, program flow proceeds to block 176. At block 176, a check is made to determine if the channel is busy, if the channel is busy, program flow proceeds to block 182 where a random delay is inserted and then program flow proceeds back to block 178 to re-test to determine if the channel is still busy. If at block 172 the channel is not busy, program flow will proceed to block 178 where a "request for service" data command packet is transmitted to indicate that there is a message available for base retrieval. Program control will then be transferred to the START entry point of FIG. 3 as indicated at block 180.

Figure 6:
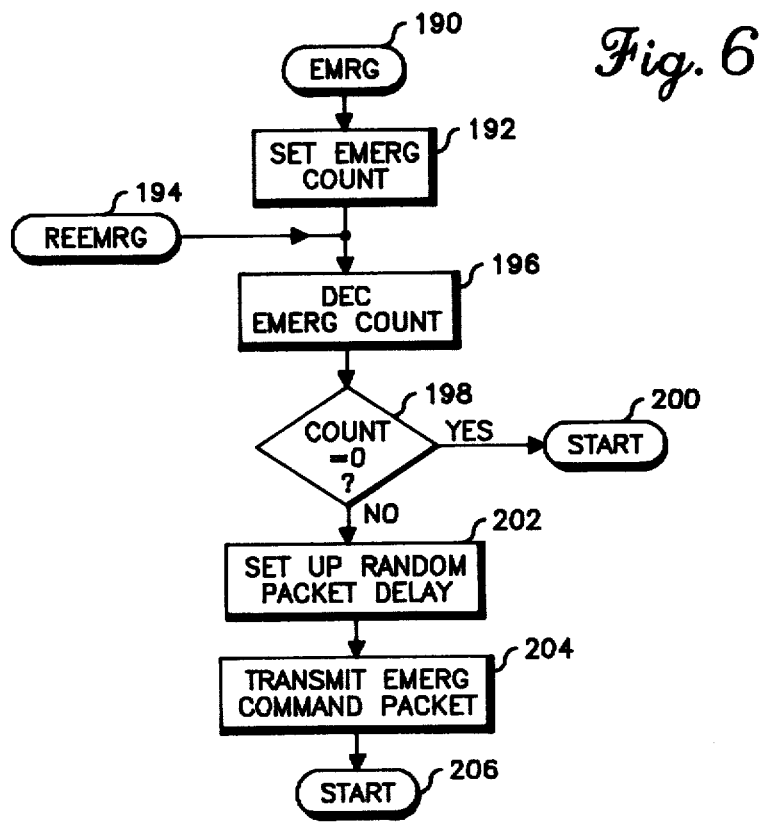
FIG. 6 is a flow diagram of the EMRG routine of the mobile unit computer program for the invention.

The EMRG routine as illustrated in FIG. 6 is entered at block 190 and program flow proceeds immediately to block 12 where the EMERG count is set. Program flow then proceeds to block 196 where the EMERG count is decremented. As indicated at block 194 this location in the program can also be entered from the REEMRG entry point. Program flow then proceeds to block 198 where the EMERG count is tested to determine if it is equal to zero, and if so, program control will be transferred to the START entry point as shown at block 200. If the count is not equal to zero, the program flow will proceed as shown at block 202 where random packet delay is set up for timing the retransmission of subsequent data packets. Program flow then proceeds to block 204 where the emergency command data packet is transmitted followed by transfer of program control to the START entry point of FIG. 3 as indicated at 206.

Figure 7:
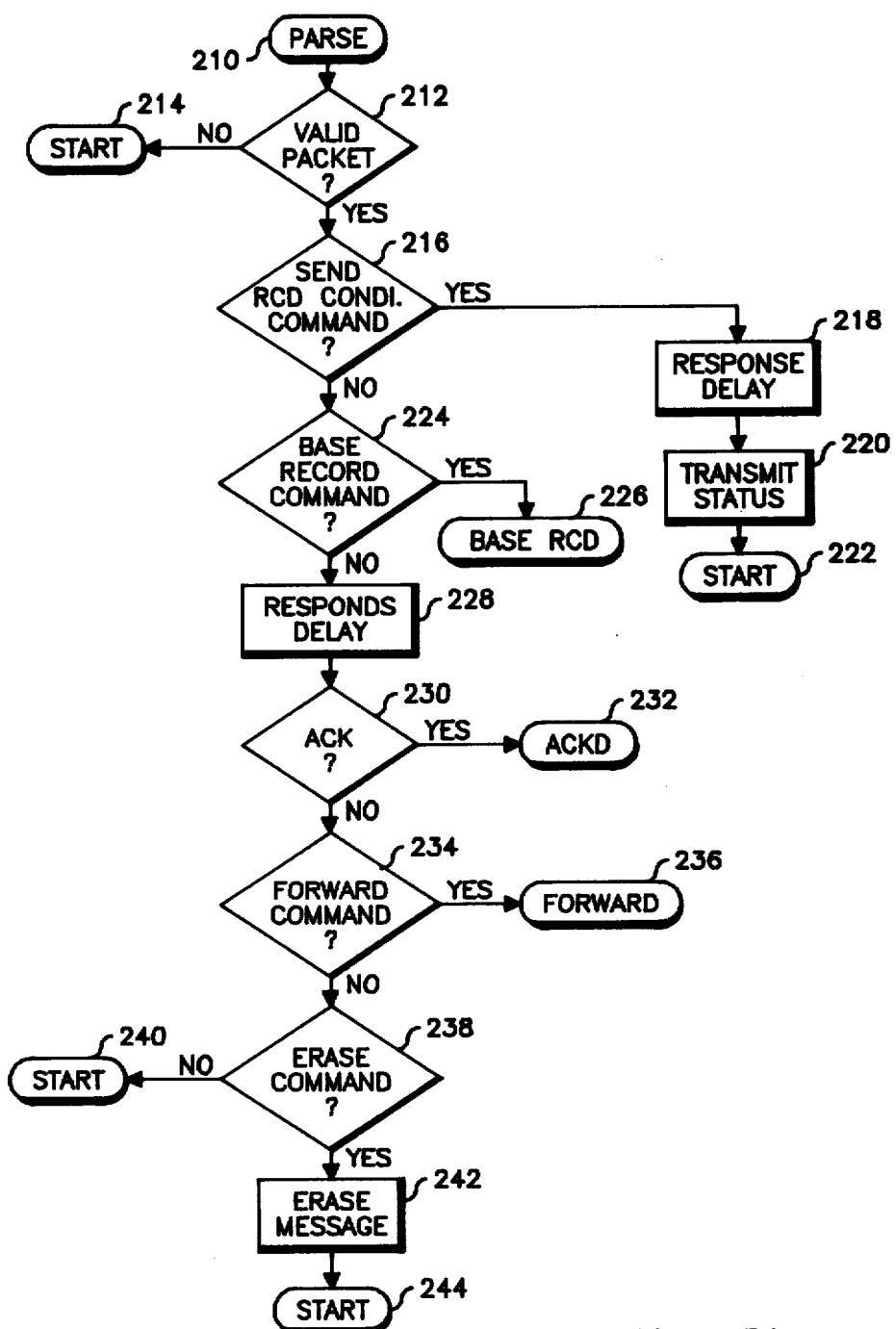
FIG. 7 is a flow diagram of the PARSE routine of the mobile unit computer program for the invention.

A flow diagram of the PARSE routine is illustrated in FIG. 7 which shows the routine entered at block 210 with program flow proceeding immediately to block 212. At block 212, a test is made to determine if a valid data command packet was received and if the result is negative, the program control is transferred to the START entry point of FIG. 3 as indicated at 214. If the packet was a valid packet, then program flow proceeds to block 216 to test the packet to determine if a send recorder condition command was received and if so, the program flow proceeds to block 218. At block 218, a response delay is added and the status of the mobile is transmitted at block 220 followed by transfer of program control to the START entry point as indicated at 222. If at 216, the result was negative, program flow will proceed to block 224 where the data command packet is tested to determine if the base record command was present, and if so, program control is transferred to the BASE RCD routine as indicated at 226. If no base record command was received, then program flow proceeds to block 228 as shown, where a response delay is inserted which allows for the system to settle before a return transmission. Program flow then proceeds to block 230 where the packet is tested to determine if it is an acknowledge and if yes, the program control is transferred to the ACKD routine as indicated at 232 and if not, program flow will proceed to block 234. At block 234, the data command packet is tested to determine if a forward command is present and if so, program control will be transferred to the FORWARD routine as shown at block 236. If the result at block 234 is negative, program flow proceeds to block 238 where the command data packet is tested for an erase command and if not present, program control will be transferred to the START entry point as indicated at 240. If present, program flow will proceed to block 242 where all messages are erased. Program control is then transferred, as shown, to the START entry point of FIG. 3 as indicated at 244.

Figure 8:
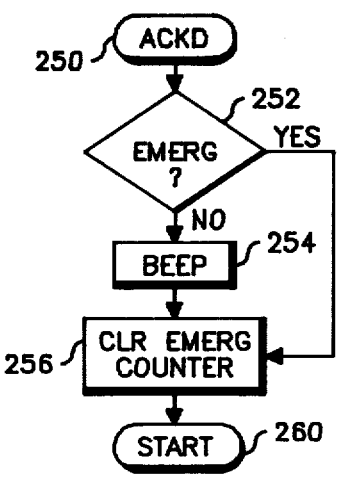
FIG. 8 is a flow diagram of the ACKD routine of the mobile unit computer program for the invention.

The ACKD routine is illustrated in FIG. 8 and, as shown, is entered at block 250 with program flow proceeding immediately to block 252. At block 252, a check is made to determine if an emergency mode exists and, if not, program flow will proceed to block 254 where a beep is sounded to alert the operator that an acknowledge packet was received followed by progression to block 256, as shown. If an emergency is in progress, program flow proceeds directly to block 256 where the emergency counter is cleared. Program control is then transferred back to the START entry point shown in FIG. 3 as indicated at block 260.

Figure 9:
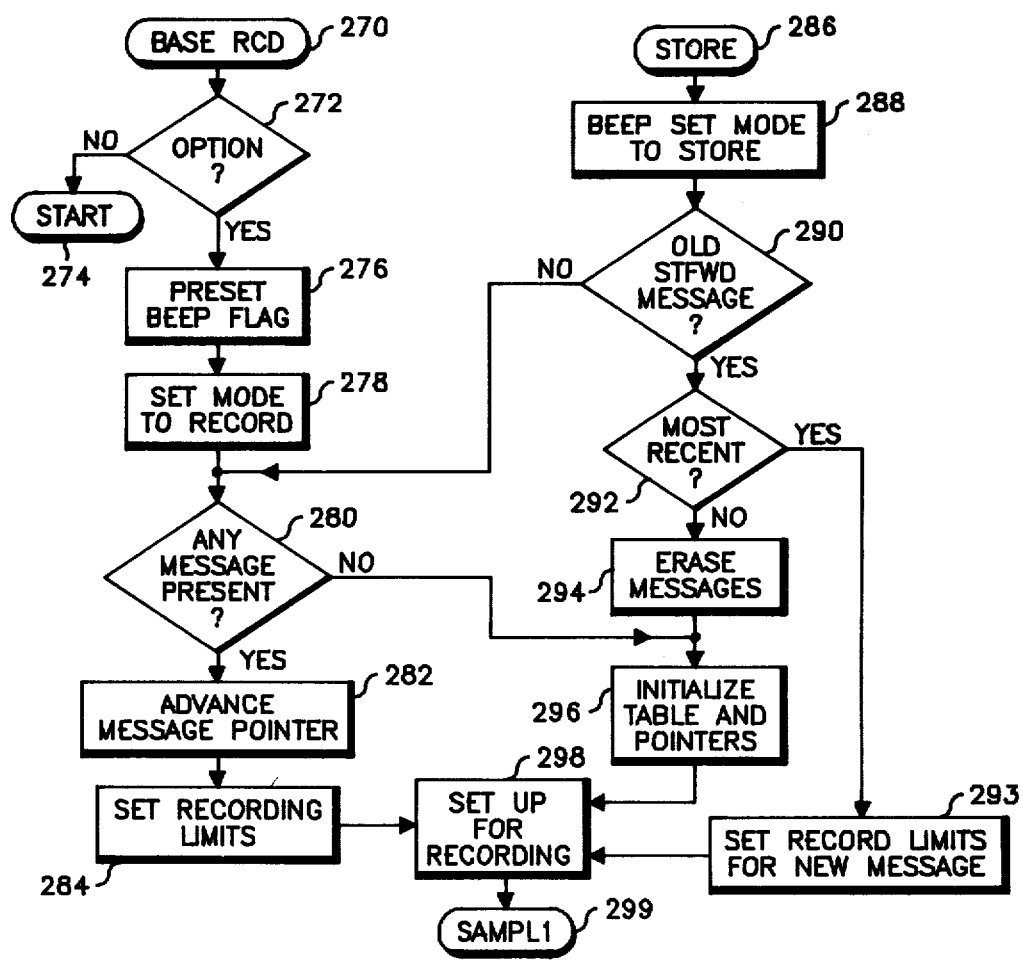
FIG. 9 is a flow diagram of the BASE RCD/STORE routine of the mobile unit computer program for the invention.

A flow diagram of the BASE RCD/STORE routine is shown in FIG. 9, which indicates entry to the BASE RCD entry point at 270. Program flow proceeds from block 270 to block 272 where a check is made to determine if the base record option is available, and if not, program control will be transferred back to the START entry point as indicated at 274. If the option does exist, the program flow proceeds to block 276 where the beep flag is preset to prevent beeping for unreviewed messages. Program flow then proceeds to block 278 where the flag is set to the base record mode and program flow then proceeds to block 280. At 280 a test is made to determine if there are any messages present and if so, program flow proceeds to block 282 where the message table pointer is advanced to the next location followed at block 284 by setting of the start and stop addresses. Program flow then proceeds to block 298 where RAM addresses, tables, ports and constants are initialized to set up for recording. If, at block 280, the result was negative, program flow proceeds to block 296 to initialize the message table at the beginning of the RAM. At block 286 the STORE entry point permits entry to block 288 where a beep is sounded to inform the operator that he is not transmitting and to set a mode flag to the STORE mode. Program flow will then proceed to block 290 where a test is made to determine if there is already an old store and forward message present. If not, program flow proceeds to block 280 as shown, and if the result is positive, program flow proceeds to block 22. At block 22 a check is made to determine if the old message is the most recent and if yes, recording limits are set as indicated at block 293 setting the new start address at the old stop address and the new stop address at the old start address. If the result at block is negative, program flow will proceed to block 24 where all messages are erased followed by initialization of the message table as indicated at 296. From block 296 as well as from block 293, program flow will proceed to block 298 and from 298 program control is transferred to the SAMPL1 routine as indicated at 299.

Figure 10:
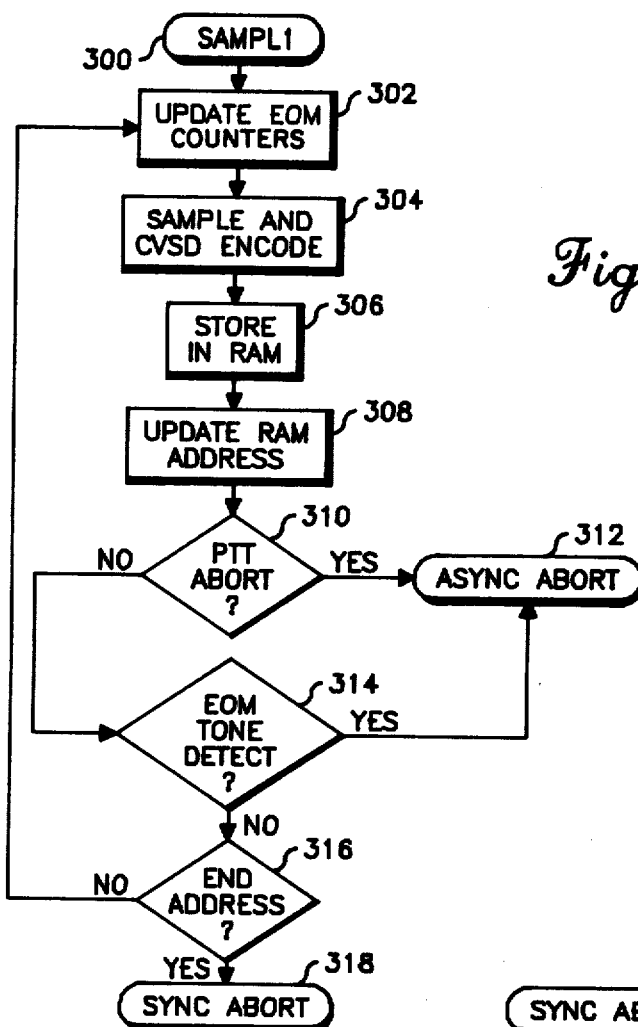
FIG. 10 is a flow diagram of the SAMP1 routine of the mobile unit computer program for the invention.

FIG. 10 illustrates the SAMPL1 routine which, as shown, is entered at block 300 where program flow proceeds directly to block 302 to update the "end of message" counter. From block 302, program flow proceeds to block 304 where a sample is taken and CVSD encoded followed by storage in RAM as indicated at 306. Program flow then proceeds to block 308 where the RAM address is updated followed by a test of the PTT at 310. If the result at block 310 is positive, program control is transferred to the ASYNC ABORT entry point of FIG. 11 as indicated at 312. If the result at 310 is negative, program flow will proceed to block 314 where a test is made for the end of message tone. If the tone is detected, program flow will proceed to block 312 and, if not, an end address test is made as indicated at 316. If the end address is not detected, then program flow will proceed back to block 302 and if the result at 316 is positive, program control is transferred to the SYNC ABORT entry point of FIG. 11 as indicated at block 318.

Figure 11:
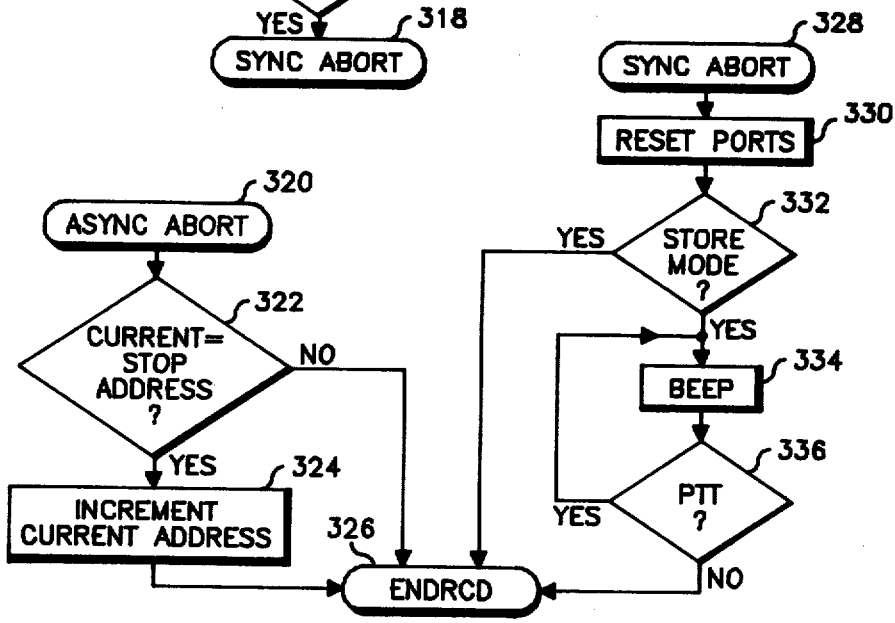
FIG. 11 is a flow diagram of the ASYNC/SYNC routine of the mobile unit computer program for the invention.

The ASYNC/SYNC ABORT routine is illustrated in FIG. 11 and shows entry at the ASYNC ABORT entry point at block 320. From block 320, program flow proceeds to block 322 where a check is made to determine if the current address is the stop address, and if the result is negative, program control will be transferred directly the ENDRCD routine as indicated at 326. If the result of the test at 322 is positive, the current address is incremented to the next full block as indicated at 324, and program control is then transferred to the ENDRCD routine as indicated at 326. The program may also be entered at the SYNC ABORT entry point indicated at 328 where program flow proceeds directly to block 330 to reset the ports to stop recording. Program flow then proceeds to block 322 where a test is made to determine if the system is in the store forward mode and if negative, the program control is transferred to the ENDRCD routine as shown, and if positive, program flow proceeds to block 334. At block 334, a beep is sounded indicating that the memory is full until the PTT button is released as indicated by block 336. When the PTT button is released, program flow proceeds from block 336 to block 326 where the program control is transferred to the ENDRCD routine.

Figure 12:
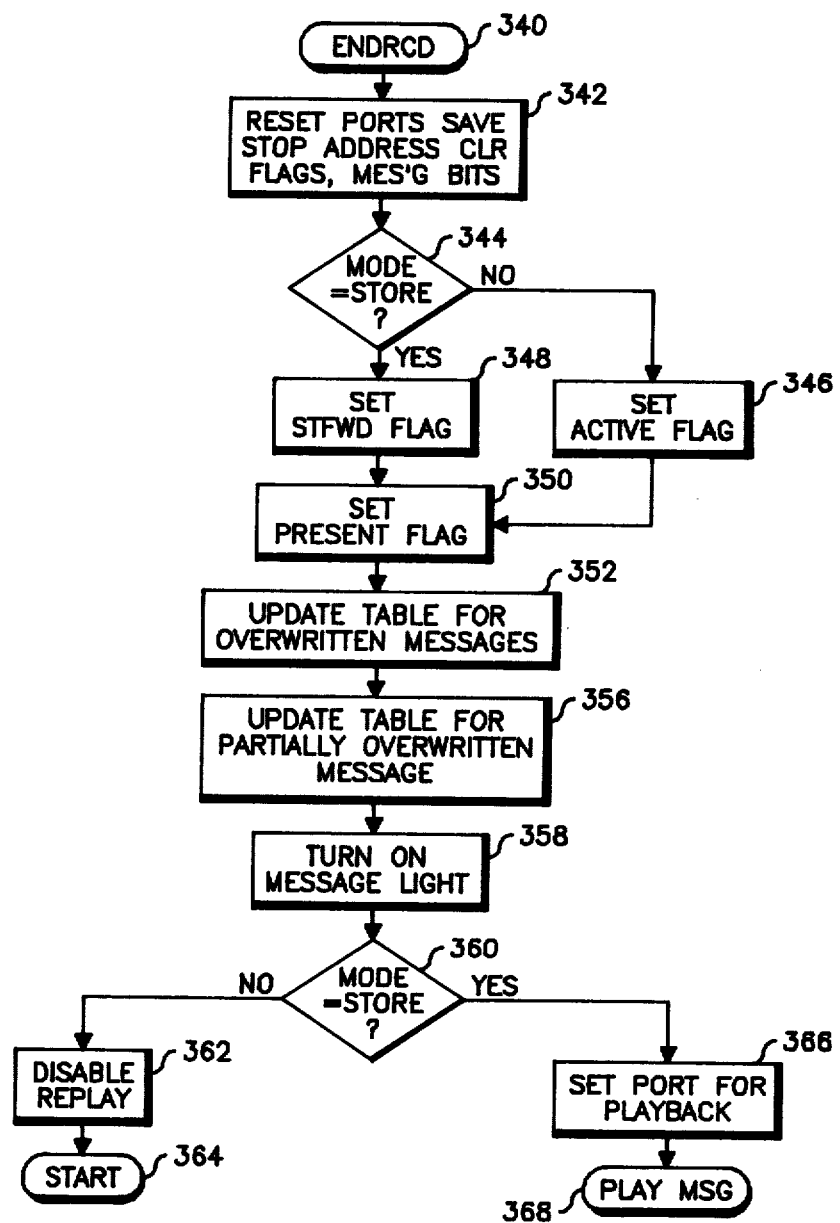
FIG. 12 is a flow diagram of the ENDRCD routine of the mobile unit computer program for the invention.

As shown in FIG. 12, the ENDRCD routine is entered at block 340 and program flow proceeds to block 342 where the ports are reset to stop recording, the stop address is saved in the message table, and the message flags are cleared. Program flow then proceeds to block 344 where a check is made to determine if the system is in the STORE mode. If not, the active message bit is set as indicated at block 346, and if in the STORE mode the store forward message bit is set as indicated at block 348. From blocks 348 and 346 program flow proceeds to block 350 where the PRESNT flag is set. The program then proceeds to block 352 where the message table is updated for overwritten messages, and to block 356 where the message table is updated for any partially overwritten message. Program flow then proceeds to block 358 where the message light is turned on if any active messages are present, and to block 360 to again test to determine if the system is in the STORE mode. If not in the store mode, program flow proceeds to block 362 to disable replay and then program control is transferred to the START entry point of FIG. 3 as indicated at 364. If the system is in the STORE mode, program flow proceeds to block 366 where the ports are set for playback, and then program control is transferred to the PLAY MSG as indicated at 368.

Figure 13:
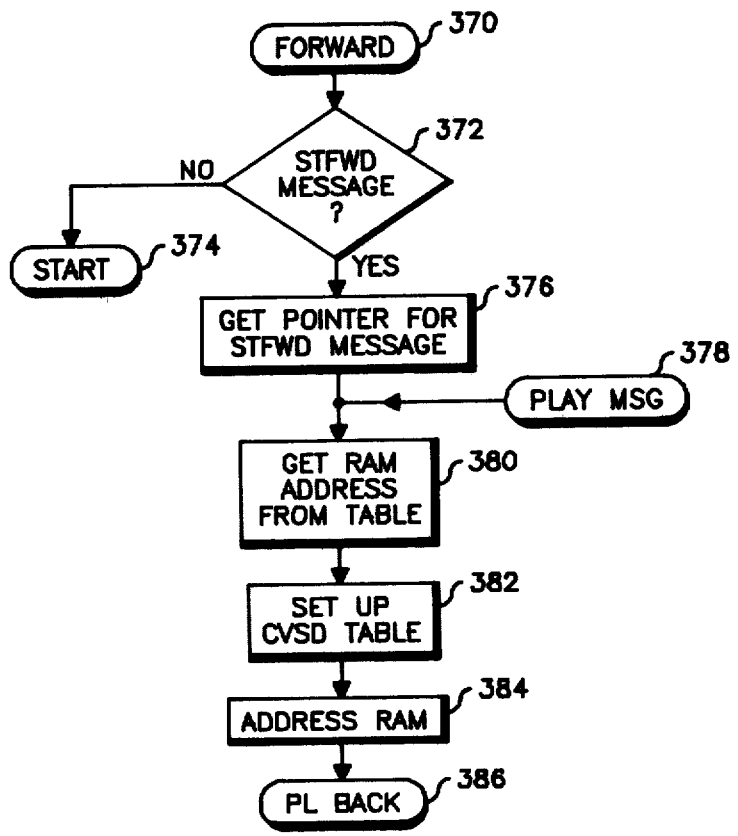
FIG. 13 is a flow diagram of the FORWARD routine of the mobile unit computer program for the invention.

A flow diagram of the FORWARD routine is illustrated in FIG. 13 which shows entry at block 370 with program flow proceeding directly to block 372. At block 372, a check is made to determine if a store forward message is stored in the voice memory and if not, program control is transferred to the START entry point of FIG. 3 as indicated at 374. If a store forward message exists, program flow proceeds to block 376 to get the table pointer for the store forward message and then to block 380 to obtain the RAM address from the table as indicated at 380. Also, as indicated at 378, the PLAY MSG entry point to block 380 is provided. Program flow proceeds from block 380 to 382 where the CVSD look up table is set up in the microprocessor and then to block 384 where the RAM addresses are generated and the RAM is addressed. Program control then transfers to the PLAYBACK routine as indicated at 386.

Figure 14:
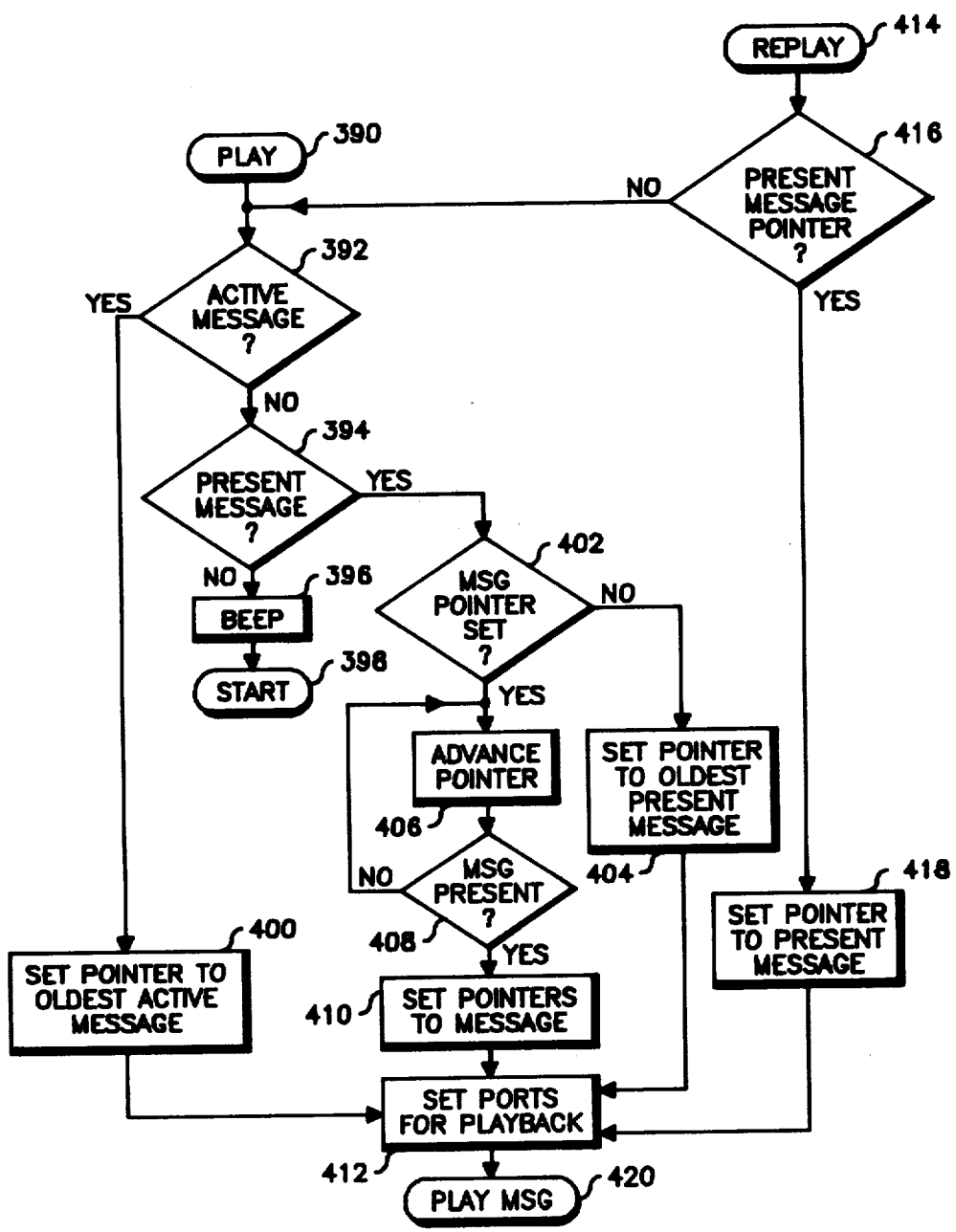
FIG. 14 is a flow diagram of the PLAY/REPLAY routine of the mobile unit computer program for the invention.

A flow diagram of the PLAY/REPLAY routine is illustrated in FIG. 14 with the PLAY entry point indicated at 30. From 390 the program flow proceeds to block 32 where a check is made to determine if there are any active messages present. If the result is positive, program flow proceeds to block 400 where the table pointer is set up for the oldest active message followed by the setting of output ports for playback as indicated at 412. If the result at 392 is negative, program flow proceeds to block 344 where a test is made to determine if there are any present messages in memory and if not, a beep is sounded, as indicated at 396, and program control is transferred to the START entry point as indicated at 398. If the result at block 394 is positive, program flow proceeds to block 402 where a check is made to determine if the message pointer is set. If not, the program proceeds to block 404 where the message pointer is set to the oldest present message and then the ports are set for a playback as indicated at 412. If the message pointer is set, the program proceeds to block 406 where the pointer is advanced and a test is made to see if a message exists at the new location at block 408. If not, the program flow proceeds back to 408 to advance the pointer again, and if the result at 408 is positive, the program flow proceeds to 410 where the pointer is set to that message, and then program flow proceeds to block 412 where the ports are set for playback. If the program is entered at the REPLAY entry point at 414, program flow will proceed to block 416 where the pointer is tested to determine if it is a present message. If not, program flow proceeds to block 392 previously described but otherwise proceeds to block 418 where the table pointer is set to the oldest present message. The program then proceeds to block 412 and from block 412 program control is transferred to the PLAY MSG entry point shown in FIG. 13 as indicated at 420.

Figure 15:
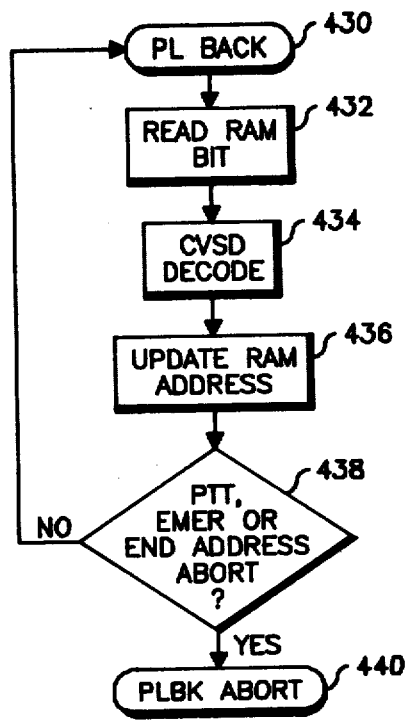
FIG. 15 is a flow diagram of the PLBACK routine o the mobile unit computer program for the invention.

FIG. 15 is a flow diagram of the PLBACK routine of the mobile unit computer program and is entered as shown at block 430. From block 430 the program flow proceeds to block 432 where the RAM is read and then CVSD decoded as indicated at 434. The RAM address is then updated as indicated at 436 and program flow proceeds to block 438 where a test is made to determine whether a PTT, emergency or end address abort signal has occurred. If the result is negative, the program flow proceeds back to block 430 but otherwise program control is transferred to the PLBACK ABORT routine as indicated at 440.

Figure 16:
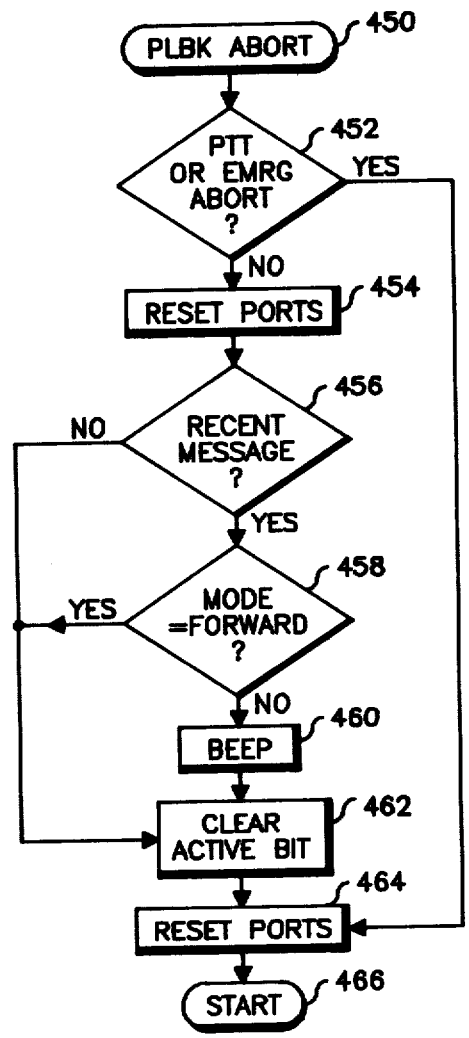
FIG. 16 is a low diagram of the PLBK ABORT routine of the mobile unit computer program for the invention.

The PLBACK ABORT routine is illustrated in FIG. 16 and shows entry at block 450. From block 450 the program proceeds to block 452 where a test is made to determine whether the abort is a PTT or emergency abort and if so, the program flow proceeds directly to block 464 to reset the ports and then return program control to the START entry point of FIG. 3 as shown at 466. If the result at block 452 is negative, program flow will proceed to block 454 where the microprocessor ports are reset followed by a test at block 456 to check to see if the message just listened to was the most recent. If not, program flow proceeds to block 462 which clears the ACTIVE flag. If the result of the test at 456 is positive, the program flow proceeds to block 458 where a test is made to determine if the message is a forward message from the base and if so, the program flow again proceeds to block 462. However, if the result at block 458 is negative, a beep is sounded as indicated at 460 followed by clearing of the ACTIVE flag as indicated at 462. Program flow then proceeds to block 464 where the microprocessor ports are reset, and then program control is transferred directly to the START routine as indicated at 466.

Figure 17:
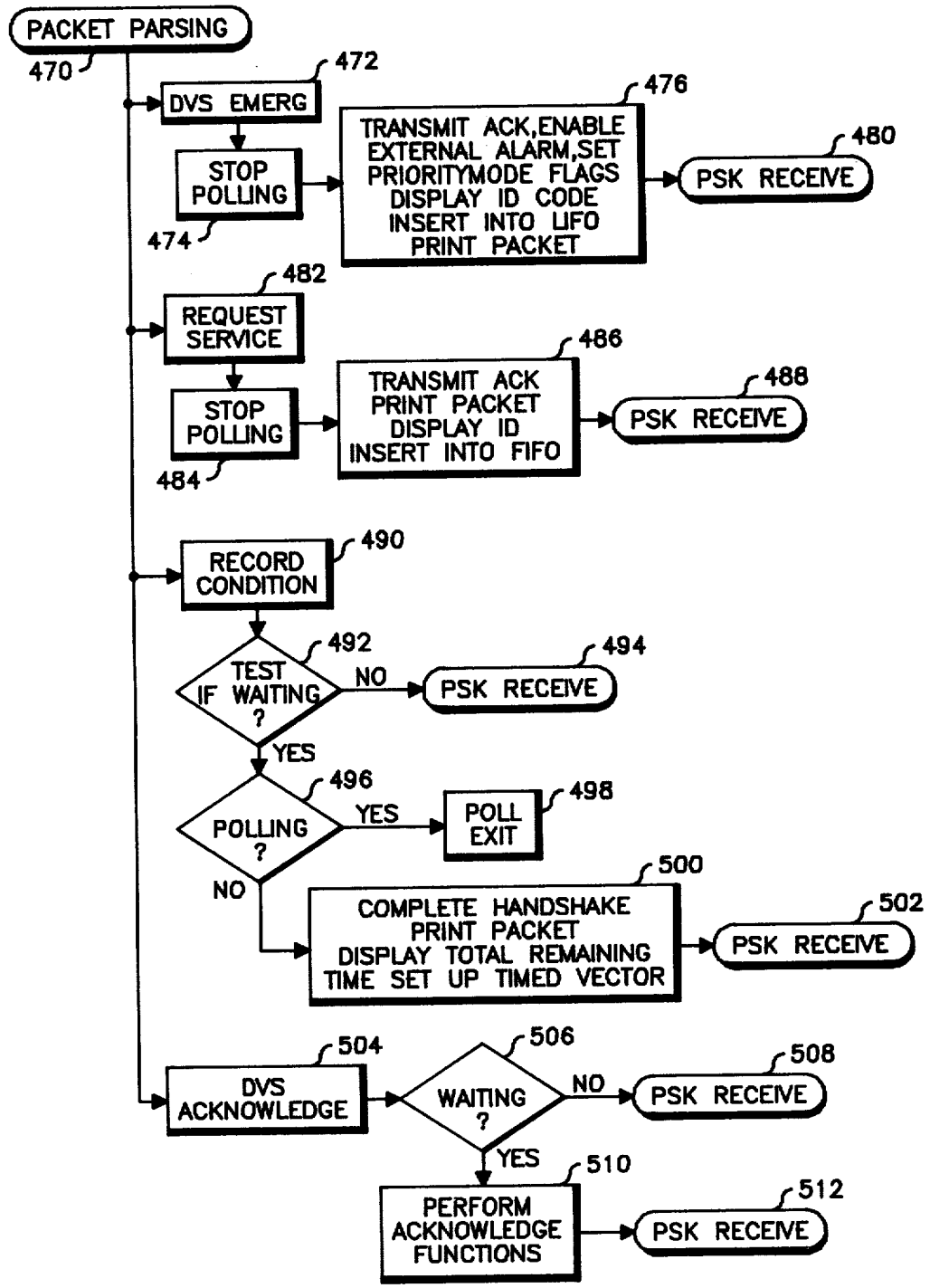
FIG. 17 is a flow diagram of the modifications to the PACKET PARSING routine of the base unit computer program for the invention.

As described herein before, the base unit for the digital voice storage system is identical to that described in previously cited co-pending application with the exception of certain modifications to the software described in that application. FIG. 17 is a flow diagram showing additions to the packet parsing routine described in the above referenced application wherein the packet parsing routine is contained following the new operator status function (shown at 358 of FIG. 8B of the above referenced application) such that the new functions shown in FIG. 17 are added to the packet parsing routine. Thus, as shown in FIG. 17, the additions starting after the new status operation of the original packet parsing routine, begin at block 470 proceeding immediately down to block 472 where a command data packet calling for a digital voice storage emergency function transfers the control to block 472 and then to block 474 where polling is stopped if polling is occurring. Program flow then proceeds to block 476 where the DVS emergency functions are performed including the transmit of an acknowledge, enabling of the external alarm, set the priority mode flag, displaying the ID code of the mobile, and inserting into the LIFO stock for later reviewing. Program control is then transferred to the PSK RECEIVE routine as indicated at 480. The PSK RECEIVE routine is also disclosed in the above referenced co-pending application. If the request service function is addressed by the data command packet, program proceeds to block 482 and block 484 where polling again is stopped if in progress. The program then proceeds to block 486 where the request service functions are performed including the transmit of an acknowledge, printing of the packet, display of ID and insertion into the FIFO queue for later reviewing. Program control will then be transferred to the PSK RECEIVE routine as indicated at 488. A data command packet addressing the record condition function will direct program flow to block 490 and then to block 492 where a test is performed to determine if the base is waiting and if not, program control is transferred, as shown, to the PSK RECEIVE routine as indicated at 494. If the result at block 492 is positive, program flow proceeds to block 496 where a test is performed to determine if poll is in progress and if so, program control is transferred to the POLL EXIT routine as indicated at 498. If the result at block 496 is negative, the program flow proceeds to perform the recorder condition functions including completing the handshake, displaying total and remaining time, and setting up required timed vectors as shown at block 500. The program control is then transferred to the PSK RECEIVE routine as indicated at block 502. Finally, a data command packet calling for a digital voice storage acknowledge function will cause program flow to proceed to block 504 and then to block 506 where a test is performed to see if the unit is waiting and if not, program control is transferred directly to the PSK RECEIVE routine as indicated at 508. If the result at block 506 is positive, the program proceeds to block 510 where the acknowledge functions are performed and then to PSK RECEIVE routine as indicated at 512.

Figure 18:
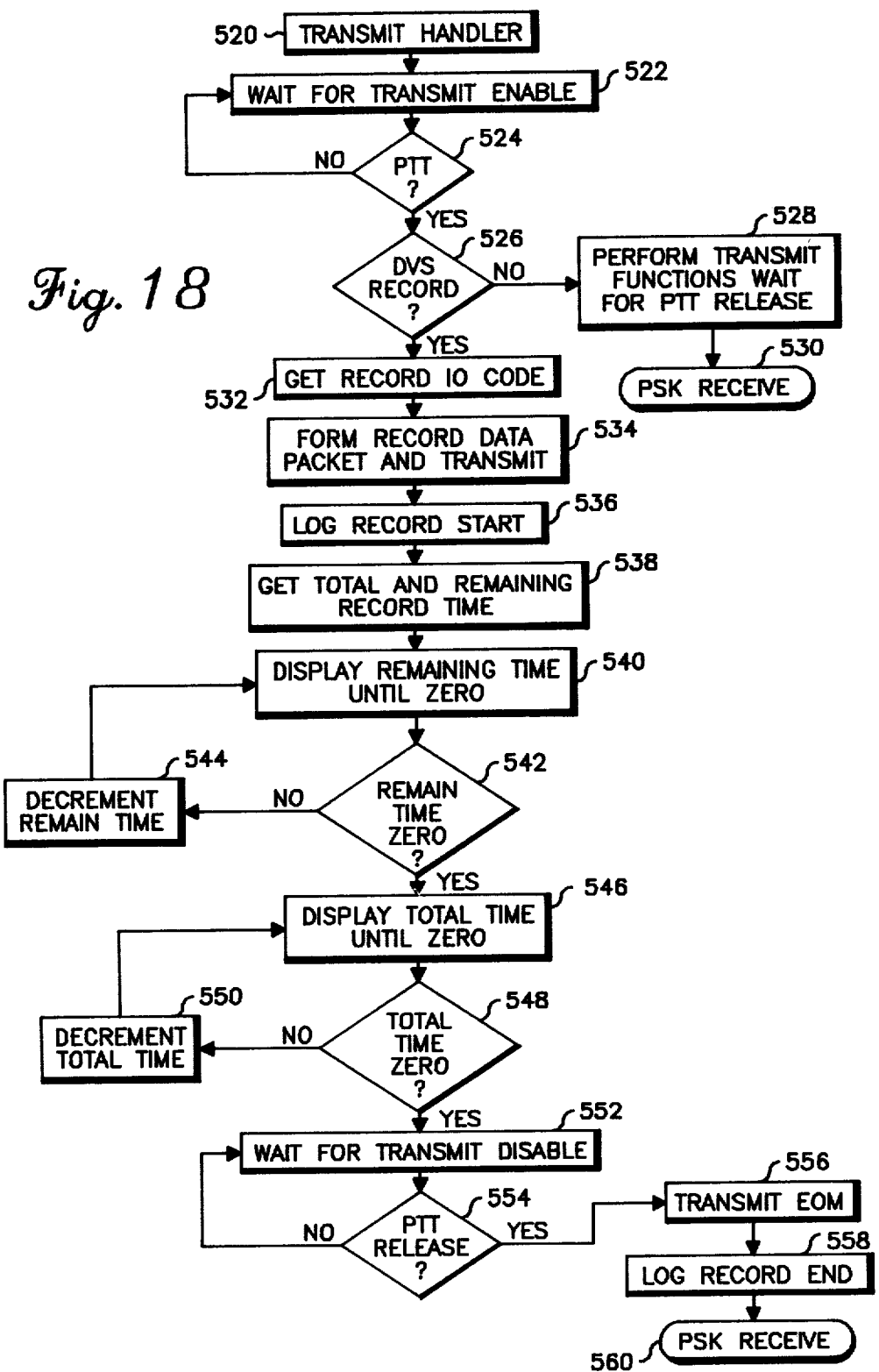
FIG. 18 is a flow diagram of the TRANSMIT HANDLER routine of the base unit computer program for the invention.

FIG. 18 is a flow diagram illustrating the transmit handler routine for the base unit computer program for the digital voice storage system. The transmit handler routine, as shown, is entered at block 520 with program flow proceeding directly to block 522 where a wait for the transmit enable occurs. From block 522 program flow proceeds to a test block 524 to test whether the PTT is activated and if not, program flow proceeds back to block 522 for another wait period. If the result at block 524 is positive, the program proceeds to block 526 where a test is performed to determine whether the base is in the digital voice storage record mode. If not, the program proceeds to block 528 where transmit functions are performed as well as a wait for the release of the PTT. The program control then transfers back to the PSK RECEIVE routine as indicated at 530. If the result of the test at 526 is positive, the program flow proceeds to block 532 to get the record ID code and then to block 534 to form the record data packet and transmit the packet. Program flow then proceeds to block 536 to log the record start time and then to 538 to obtain the total and remaining record time of the mobile unit. Program flow then proceeds to block 540 to display the remaining time and then to block 542 to test to determine whether the remaining time is equal to zero. If the remaining time is not equal to zero, program flow proceeds to block 544 where the time is decremented and then proceeds to block 540 to display the remaining time. If the result of the test at block 542 is positive, the program flow then proceeds to block 546 to display the total time and then to block 548 where a test is performed to determine whether the total time is equal to zero. If the total time is not equal to zero, program flow proceeds to block 550 where total time is decremented and then back to block 546 to display total time. If, however, total time is equal to zero at block 548, program flow proceeds to block 552 to wait for a transmit disable and to block 554 to test for the PTT release. If PTT release has not occurred, program flow proceeds back to block 552 for another delay period. If the result of the test at block 554 is positive, the program proceeds to block 556 to transmit the End of Message (EOM) tone and then to block 558 to log the end of the record.

The program control is then transferred back to the PSK RECEIVE at block 560.

In summary, a novel digital voice storage system, particularly well adapted for use in multiple unit radio communications system, and capable of multiple message storage and selective base to mobile recording, has been described.

While a preferred embodiment of the invention has been described in detail, it should be apparent that many modifications and variations thereto are possible, all of which fall within the true spirit and scope of the invention.

APPENDIX 1

The following is an Intel Hex memory dump of the computer program for the base unit for an MC6803 microcomputer according to the invention.

```
:108000002843292043 4F50595249474854203 13979
:10801000383 22C204D4F544F524F4C4120494E4343
:10802000 2E54494D204255524B450001010 2010298
:108030002830102028302838384010202830 2839A
:108040008384028383848384948501020203 02038 0
:108050003840 203038403848485020303840 38 46A
:1080600084 50 3849485848585860102020302035 6
:10807000 38402030384 0 3848485020303840 3844A
:10808000 848 503848485848585860203030403043 0
:1080900048503040 48504858586030404850 4851A
:1080A00085860485 858685868708 906030008F4
:1080B0000502 0A0704014F970897B78608970 0CE74
:1080C0000190B648174 62505BD84B02003BD84AC 99
:1080D000F668009602BD8E0D16C10C240FCE80AA44
:1080E0003AE6 00D7A196A3850427063BD7BF7E8832
:1080F000BE8E00FFC10B2623D6A52B12853A261172
:10810000 96A48548260BC50B2607BD8C0A3F7E9298
:10811000AABD84E6BD8C1BBD8C343F96A42BEE8596
:10812000826EA96A58581 26E496A3852026DE8585
:10813000 1026DA85082717C10A26D296A58502 26B 9
:108140007854026067E85277E850A7E929A8502CF
:108150002720DEC 396A5850827026E00CE48003A88
:10816000E60086 3FC1FF275ED7A2CE81D23AEE005D
:108170006E00C10A26 0F860297A397B67F00CDC670
:108180002CBD8AC33F96B627064F5F97B6DDB4DC99
:10819000B4BD8E08DAA18D21BD8C2BBD8C343FF689
:1081A000480BC4F0D79DF6480DC4F0D19D2609F6C2
:1081B00048115858585 8D19D39D7B58DE2260484B6
:1081C000F9A9D97B4398E00FFBD84C9CE92097E67
:1081D00091FC81E8828D83088 31083188 30082DEFE
:1081E000835891B083F7845DCE8227DFC5C61 0BD6A
:1081F0008AC386F097A2CE8205DFC3CC0200DDA33E
:1082000 0860897A53F96A1810A26037E82D4D6B61A
:1082100027055FD7B6D7A2D6A2BD8E08DAA1BD8347
:10822000DADDC9BD8BBB3FBD82C497BBD6B3C1EFFE
:10823000271DD7BACC507DDDD0D6BBBD83DADDCECD
:10824000CC004 0DDA35FD7CDBD81B9BD8BA73FCEAC
:10825000827EDFC5CC0040DDC9CC3871DDCBBD8B63
:10826000BBCE826CDFC386EF97A2208FD6A1C10A56
```

```
:1082700026037E82D4CAE0BD83DA97C920A596A2E0
:1082800081EF260586667E81C697BA20A786FF976E
:10829000BB96B381EF271CBAE097BABD819F271751
:1082A000840F16BD83DA97CEC640D7CFCC3871DDA8
:1082B000D0208D86FF97BACC3838DDCECC7700DD64
:1082C000D07E824096A291B2250591B122013986D5
:1082D0004F7E81C67F00A57F00A3DEC56E000D8D99
:1082E0004BCC5F01DDB88611F6481DC520260297EC
:1082F0003BD871FD6A2C00458CE8B4ABD8AC63F95
:10830000D8D29CC5F0520DC0D8D21CC63B520D41B
:10831000C8D13CC5F0220CC0D8D1196A484DF97B9
:10832000A4CC5F0420BE96A48A1897A4DCA38A0973
:10833000C4DF240FCA20C540270986067E81C68671
:108340005B20F9DDA3C540260EDCB4DDBA93AF2572
:10835000EEDCAD93BA25B839CDBD832CDCBADDA780
:108360007F00A6CC5F01DDB8C607D7A5CC0920DD11
:10837000A37F00CD7E82E6CE838BDFC3D6A4C4422A
:10838000CAB04FDDA3CE0258DF9F3FD6A4C442D798
:10839000A4BD8C64BD8BA73FB648184462505866DE5
:1083A0007E81C695C126037E940DBD876BD693BD94
:1083B0008E08DA928D24DDC95D2604C63FD7CAD661
:1083C00095C403BD8E08DA948D10DDCBBD8BBB86C2
:1083D0004B76000CE92097E91FCD7A2C40FCE8C68
:1083E00003AA600978E96A2BD8E0D162706CE8C5B
:1083F00003AE600968E39D6E12714D7A28DDBDD50
:10840000C9CC4000DDCBBD8BBBCE841A7E837AC63F
:10841000BD8AC3CE841A7E837A96E2C6043DC329
:108420007800373638EC00260CEC022608C604BD6E
:108430008AC37E8377EC00D7CD5F4D26054CA7001D
:10844000C620D7A3EC02DDB4BD8C377F00A4DCE1ED
:108450008B01195CC14026024F5FDDE13FDED89CF5
:10846000DA27CABD9193DFD896DD8B991997DD96EF
:10847000DC89991997DC9CDA27B3DCDCBD8E08D740
:108480008E978FBD8B84867797B697CEBD8BA7CE00
:1084900084957E837ADED8BD9193A60297CDEC00B9
:1084A000DDB4BD8C2BBDBC373FCE0190C617D701F4
:1084B000CC0136D30BDD0B9608854027FA8801974F
:1084C000080926ECC615D70139CE5079DFCB5FDD20
:1084D000C9BD8BBB860336CE00C88DD0CE00C88DFB
:1084E000CF324A26F13996BE84FE97BE39DCA7BD4D
:1084F000919FDDA73996A6B14812240A8DEFDDBA07
:108500002704930D2304BD8C2B3FCC0180DDA386D3
:10851000197A5CE851BDFC37E8385DCBADDB4BDA4
:108520008C34CC0820DDA3BD87258611F6481DC5F7
:1085300020260286159703BD86430F8D602A13C639
:1085400014BD8AC38D6596A4BA8097A4CE853ADF30
:10855000C33FBD8BA7BD864CC608D700C614D70342
:10856000BD8663B6481785042705BD861F2003BD59
:108570008625861597019703966A52B18BD95A6DC31
:10858000A3C5202644BD873CDCA38420C440DDA3D2
:108590007F00A53FBD84EDBD93794F204596C2C6AF
:1085A000CC5A26FD4A26F8B6580039960A84034C60
:1085B000978DB64819840FC63C3DC300C3DD9FD3D9
:1085C0009F7A00BD26F9DD9F39851027057A00C72F
:1085D000201296A544B64813840F2406B64813BD4E
```

```
:1085E0008E0D97C7CC1120DDA3CE85F1DFC38DBBE7
:1085F0003FBD873C96C727037E8527CC080497009C
:10860000D7A44F97A396A52B13C618BD8AC3BD95B3
:10861000A696A54424DA7C00A67E84F57E92A18DE0
:10862000128D5B8D1ECE00B82054BD87468D148DF3
:1086300002204BFC481ADD8A7F008986019788CE8C
:108640000B839CC112483000126FB39C615B648B1
:108650001985402702CA02D70196BE8A4097BEB745
:108660005000039B64819840F2713F6481DC5102746
:1086700034A2709CE50000926FD4A26F739860409
:10868000F6481DC5102702860B979CEC00DD88EC90
:108690002DD8ABD8EAADD8C8638BD8A890CBD8A32
:1086A000B35917BDBAA246BD8A957A008526EECCBD
:1086B000C08F74000D7089700CC0709DD89CC2AC1
:1086C00044DD8B866F978DCE8705DF819608CC01C0
:1086D0009AD309DD0B0E8655979D8D1A7A009C263C
:1086E000F5CE0089A600979D8D0C088C009C26F481
:1086F000F86089700398608C6053E5A26FC780082
:108700009D4A26F439D60BC801D7085656D89D592F
:1087100049494984049702CC019AD30BDD0B3B965F
:10872000BE847F200A96A38520261096BE8A80F6F6
:108730005800C508260597BEB7500039D6BEC4BF3D
:10874000D7BEF7500039860CB740009700CE03041F
:10875000CC018ED30BDD0B9608854027FA96028854
:10876000497020926EA860897003996CDBD8E0D3A
:108770084089783CC0400D785CE00909ABEB7506A
:1087800000CC14315A26FD9ABEB75000D685BD8E56
:108790008DA83F760003DD6024FBD8E0DE7000872
:1087A0007C00858C009D26E4D6BECA04F75000C428
:1087B000FBF7500039960273008B271C16988AD756
:1087C0008AD8085476008344CC00B02403CC00BA85
:1087D000D30BDD0B7A008C3B7A008CD608C801D70E
:1087E0008369602 16988AD78A44CC00E72403CC30
:1087F000DDD30BDD0B3298024476008D3B0F8EEB
:10880000FFCC0815DD00D703B74000B668004F65
:108810005FCE0083E70008BC00E326F897089702F4
:10882000867E9780D7C053D7DFCE7A80F64818C5AA
:108830001 02603CE7900DFD4DFD6DFD2F64819BD8B
:108840008E0DC403CA04D7108602971197E3FC4823
:10885000BDDAFC480DDDAFFC480FDDB1B64811B6
:1088600097B3B6481F4C97C2BD9481BD876BC67441
:108870009A600262B8C009226F6C670CE7800A79B
:10888000A600261B088C800026F4CE7900DFD8D5
:10889000DFDABD8C0AB6481D840F8102270CC66C36
:1088A000BD8AC38605BD84D620F9BD84A9C664BD32
:1088B0008AC3B65800492A037E9992BD981E8E003D
:1088C000FFCE00836F0008BC009E26F8CC05089729
:1088D0008CD708B614979E96C297BC96A3843F9720
:1088E000A3CC008DDD86CE87B5DF81DC09C3001403
:1088F000DD0B0E968C26FC8605978C968316988445
:10890000D784D6887300892 7037E89A34424095C11
:10891000C10226045F7C008CD788D68DC41FCE8010
:108920002A3AE600C407969C4CC10224024A4A4DEA
:108930002A014F811E2F02861E979CD6BE919E2C27
:108940000486142004CA80860A979EF74000B65811
:10895000000492A0796DE26187E87FEBD8DB9F740AE
```

```
:108960000196028502270986481D2B040F7E8C73E1
:10897000DC9F830001DD9F96A3240E7D00A42B04C1
:108980008510270SDEC30F6E00852127135885202B
:108990002705CC08172407CC001525028608DD0022
:1089A0007EBBF34424095AC1FE26045F7A008CD7DE
:1089B00088D684968B2B0156CE802AC41F3AA600F7
:1089C000D6A3C5402720C61ED79CDE86D685C1709B
:1089D00026022077C507260308DF865CD78598A383
:1089E0004869007E88F3CE008E48BDBAB8CE802AC2
:1089F0004FD68EC807543AA900CE802AD68FC80910
:108A0000543AA900CE802AD690C82A543AA900CE5A
:108A1000802AD691C844543AA900CE802AD692C85A
:108A20006F543AA900847FD6A3C43F8105230681F1
:108A3000232504CA80CA40D7A3D6B7270B86175A66
:108A4000260286159701D7B77E88F30F86368D39B3
:108A50008D508D4159E80056D68459D784C453CEE1
:108A6000802A3AA600840781022F08DC838840C848
:108A700013DD83968349498D3A7A008526D2BD8ECF
:108A8000AA938C26037E8ED73F9785CC008DDD86FA
:108A90004F5FDD8339D68359D783C465CE802A3AA8
:108AA000E600DE8608BC009C2603CE008EDF86560C
:108AB000690039CE00886905690469036902690142
:108AC000690039CE8AD23AEC00DDC9EC02DDC87EFA
:108AD0008BBB501C390079373F37545C00007171F3
:108AE0003F000000507D5E065C743830777106549C
:108AF00058777F7F7F310737395E54790054582C
:108B0000071005B5458717335507D5C38507D733EEC
:108B1000373E5C38373E795E796D735E39004F546D
:108B200058715038390053E30373E5E30507D5E30CF
:108B300038717D5C50735C63635C5C7D00007C001D
:108B4000507977005079390050797639500039796 9
:108B5000500031077970775079003950603950D8
:108B6000730076396D00DC8E8D34D7CB168D2FD700
:108B7000C9DC8EBD8E0D8D26D7CC168D21D7CACEE1
:108B800000CC2026DC8E8D16D7D0168D11D7CEDCEA
:108B90008EBD8E0D8D08D  71168D03D7CF39CE8CD3
:108BA000C40F3AE60039CE00D15F8D4497CC8DDA
:108BB0004097CB8D3C97CAA60097C9BD8C64864070
:108BC00097C8CE00C8C607D785A6005F4659F7608C
:108BD00000CA02F76000C401F760007A008526EB46
:108BE00088C00CE26DF96CDBD8E0D8408B76000C0
:108BF00039A60009813F27025C395D2701394F39C9
:108C00003F065B4F6666D7C077F6F8D0FDDE1BD8199
:108C1000B9DED89CDA271D387E847A96BE84829786
:108C2000BEB75000BD8725861597034F5FDDA3971C
:108C3000A597DE397F00CDDCB4D78EBD819F26029B
:108C4000840F978FDE8E2706BD8B847E8BA7B64858
:108C50001B4724F496C126F0CC4040DDD0863FDD95
:108C6000CE7E8BA796CD847FDED89CDA27028A80C1
:108C700097CD3996C297BCBD87257F40008608975F
:108C800000DCA384FD97A3C5082626853C2613DCBB
:108C9000A4C5082707BD8C1B8D9A20065625034DB9
:108CA0002A0FBD8659BD97F4BD8643BD8DA77E8D25
:108CB00064B658002A2AC614BD8AC3BD864386629C
:108CC000D602C5022606BD8BA77E8D64F658002B02
:108CD0007BD859D2BE820084A26E5BD8DB720DE1F
```

```
:108CE000BD8659BD8BA7D6A4C508261B7F00CDBD68
:108CF0008BA7B648192A1096C0270C0CBD8326CC2A
:108D00005F02DDB87F00A2F64817BD8E0D96A484E1
:108D100008462608BD8643BD97F4202C36BD864CF8
:108D200086149703BD866332B1842605BD861F2085
:108D30000E4D2A08BD862FBD97F42006BD8625BDA1
:108D400095A6C615D701D703B64817BD8E0896A4B9
:108D50008410463685082705BD8E122003BD8DA7D9
:108D6000324D2608BD8643BD97F42022C614D70392
:108D70008188261EBD862ACC15009703D7A3D6A4CA
:108D8000C440D7A4860297A2BD95A6BD8BA7BD8778
:108D90003C3F81082605BD874620DCBD862FC615D1
:108DA000D703BD97F420E48696D602C50226013982
:108DB0004A26F68D0220F0D6BEDED49CD6260D7A49
:108DC0000BD2602C4FD96C297BC2032C5022614FF
:108DD000B65800850426EF7A00BC2622CA02861403
:108DE00097BD201A9603850827149611B520270E13
:108DF0009CD22603CE80009DFD4A6009713F7503B
:108E0000096BE0556D7BE39050505390404048C
:108E10000439D6A4C540262FC502272B96A99784CE
:108E20007F00A97D00AA2F0C8D287A0084270C7A58
:108E300000AA2EEF5F9684DDA92EEDC628BD8AC359
:108E4000D602C50226FA394F5FDDA98D057C00AA3E
:108E500020F98D19CE0179C6FA9602850227075AA4
:108E600026F70926F2398614970331313996A981FC
:108E70006426034F97A997868D11978F96AA978698
:108E8000BD09BD8B668604B7600039C6087F008EE9
:108E900096864824014C978686009 98E19978E5A9B
:108EA0002707998E19978E20E739CE00884F5F37B4
:108EB000A800978744444444 98879787164F050530
:108EC000505D7860598869786D887329886088CBB
:108ED0000 8C26DB435339B65800492A0896DE2712
:108EE0004DEC56E00860897009688813F26579657
:108EF0008A9786840F979D96BA84F09A9D978ABD2B
:108F000090C52650BD910CBD904D96A52A0ADC^BAC
:108F1000BD919FDDAB7E92A1462415BD9714BD/0F7
:108F2000F17C00A6BD90E125037E84F57F00A53F7E
:108F3000BD9714BD90F1CE838BDFC3C6824FDDA3F6
:108F4000CE0708DF9F3FDC8AB3480D2507FC480B9E
:108F5000938A24013F96882640B648148504260 14A
:108F60003FBD9714B6481784402709BD9 06224047A
:108F7000BD906D3F96A385202706DE8A9CB4270608
:108F800096BE8A0197BEBD9127CC201097A39688E4
:108F90002702C601BD903520D7810326189 6892661
:108FA00013BD90C5260EBD904ABD9714C61CBD8A40
:108FB000C37E83773F81012630B648148501272878
:108FC000BD9714BD905A2508BD9127C610BD902F9E
:108FD000B648168540271 1B648142B05BD90D12000
:108FE000796892BF7BD90D93FDE888C1F0327B1E8
:108FF0008C1F01260BB6481485082 7037E8F613F1E
:109000008C1F0226FAB64814850227F3BD9714BDBB
:10901000905A2517B648188510270C96DF2708BDEB
:109020009162BD8BBB2004C6018D04BD906D3F963F
:10903000A385202637D7CD8D11DE8A9CB4270486E0
:109040007897B7DC8ADDB47E8C377F00A596A38441
:10905000205FDDA37300B67E873C0CB648178502FF
```

```
:10906000270ADC8A93AF2504DCAD930A39B648160B
:109070004724514725048DEA254A96A48A0197A4DE
:10908000BD95A6CE03E8BD84ACCC5F037D008826E9
:1090900003CC2000DD88B648168504260AB65800A1
:1090A0002BFBBD859D2BF696BE8A40B75000C6149B
:1090B000D703BD8663CE0088BD867E86159703964E
:1090C000BEB7500039DE8A9CBA260596A3438510A8
:1090D00039BD906225FA7E871FBD906225F27E879A
:1090E000250CB648188508270796898502270110DA3
:1090F000395F968985012702CA0885022702CA01BD
:10910000D7CDBD8E6DD6A4CA02D7A43996868470F9
:109110008B10C6A63D4497A9968984FCC6A63DC37C
:10912000298444497AA39B6481885202733DE8A26
:10913000BC780226079688B178002725CE78FC09EE
:10914000A600A7048C780026F6DC8AFD78029688B3
:10915000C610811F2603CC0001FD7800CC0101DD83
:10916000E139DCDA93D827163736388C017D2705AC
:109170008CFFFD260139DEDAEC00938A27F7DEDA70
:109180008D11DFDADC8AED008601A702DCDC8D0FB1
:10919000DDDC390808088C7A802603CE790039DDB9
:1091A0008E968F8B0119978F968E890019D68F39DD
:1091B000C630BD8AC3CC0200DDA3860897A5CE9138
:1091C000C4DFC33FD6A17F00A5CE91D4583AEE00AC
:1091D000863F6E00839892FD91EA935C92B9923536
:1091E00092E39221923E924681C6BD819F260586DA
:1091F0006D7E81C6C65CBD8AC3CE9210DFC3CC0033
:1092000080DDA3CE04B0DF9F3FBD8C2BBD8C343FEF
:10921000CE921BDFC5CC77407E825796A297B320B3
:10922000E8B648192AC97300C0270FC608BDBAC30B
:10923000CE920920C77300DF26F1C60C20EFBD983F
:1092400011BD94C820C396BF26104F4397CDC620AA
:10925000BD8AC3860CB7600020D6C654BD9A8CCE9A
:1092600092642010DEA7DFB40DBD832CC624BD9A06
:109270008CCE927BDFC54F5F7E930FDEA726037EE9
:109280009209DFB44F5FDDA7DDABCC5F01DDB886AF
:109290001097A2864097A57E836CBD9834868097F0
:1092A000A5DEA79CB427037E8522BD9834C628BDC1
:1092B0009A8CDCABDDB47E8111C634BD8AC3CE92FC
:1092C000C47E91FCD6B1CE92DBDFC5BD83DADDC9A9
:1092D000CC507DDDCBBD8BBB7E81F6BD939E97B11F
:1092E0007E9209C63BBD8AC3CE92EE7E91FCD6B27C
:1092F000CE92F520D4BD939E97B27E9209C63CBD16
:109300008AC3CE93087E91FCCE9353DFC5DCADDDDE
:10931000A78D66CC0200DDA3860897A5CE9322DF39
:10932000C33F96A1810A26067300B67E82D48D01C2
:109330003F96B627064F5F97B6DDA7DCA7BD8E0820
:10934000DAA1D7A8BD819F2604840F9A9D97A7D63E
:10935000A820268D35DEA7DFAD7E9209C640BD8AE6
:10936000C3CE93677E91FCCE9370DFC5DCAF209FA8
:109370008D18DEA7DFAF7E9209D78EBD819F2602B2
:10938000840F978FBD8B847E8BA7DCA7B3480D25F8
:109390008FC480B93A72501398658B7E81C696A2FF
:1093A000B148102506B1480F220139864F7E81C68B
:1093B000540427335076665B3107775E545C27335D
:1093C00050526400CC400097CBD7A2D7A1D786D605
:1093D000A2C40FD787BD8E08DAA1BD83DADDC9BD6F
```

```
:1093E0008BBB0E3E0FD6A1C10B2705C10A26DE3965
:1093F0008E00FF7E920936CE93B0BD8AC6CE17701E
:10940000BD84B03297CC8DBCDE8696A23986049797
:10941000A3CC06008DE0816024F7DF92CC5B048D45
:10942000D5812424F7DF9481122506D695CA04D766
:10943000 95F64818C5402608D695CA08D795201431
:109440004D2605CC0201200A81132508DC948002F8
:10945000C001DD94CC4F088D9D813224F74D27F457
:10946000DF97CC660C8D8F811324F74D27F4DF999D
:10947000CC6D108D81DF9B7F00968D05D7C17E83DB
:10948000AA7F0085CE0090CC04F89ABEB75000D7D2
:109490000 0C6315A26FDD685A600BD8E0 8F76000AD
:1094A000970286249ABEB7500084DFB75000087C2C
:1094B000 00858C009D26DFC608D70096BEB75000F9
:1094C00039BD98118540273C7F00E0C60C8D1F8D6B
:1094D0003396E32707CE800086218D4F4F97E38D8B
:1094E0023CE986D8634 8D43201AC40FCA303CDEDB
:1094F000D69CD22603CE80 0009DFD6E70038398D0E
:10950000ED1620EA8D007C00E0C60D8DE1C60A8DC7
:10951000DDB648182A09CC0E0F8DE486072021CC31
:1095200005008DCA4A26FB860E2015E6008DBF0871
:109530004A26F83996C12706B6481846250A8618DD
:10954000C6208DAA4A26FB39BD876BBD968ADC945E
:10955000C4F38DABC63A8D96DC928DA3C63A8D8E40
:10956000DC908D9BC6209695850826 08C6708504DC
:109570002602C661BD94EE8D29DC978D82C62DBD75
:1095800094EEDC998330305D27028B0A4AC6033D96
:10959000CE98EB3A86038D93C62DBD94EEDC9BBD31
:1095A00094FF8603209ABD9811B64814D6A4C5012D
:1095B000271B8520260139BD9623DC8ABD9628BD50
:1095C0009534CE98E2BD96A6BD97B3203785402747
:1095D00011DCA4562405850426083996A385102796
:1095E000139B64815850826 01398D37DCBA8D3822
:1095F000BD9534BD969C96A485042722CE98A1865D
:109600005BD952BBD9506D6E0C13C260AB648158A
:1096100085402703BD94C896A484FA97A439DCBA80
:109620007E97DEFC481A2012B1FF273CC1FF2744A9
:10963000979084F081E0272096908D0FBD819F2622
:10964 0004 86209790BD98657E95A29791D793BD8B
:109650008E0D9790D7922032D793BD8E0DD7928DD5
:1096600029CC4752DD9020DDCC2041DD90CC4C4C04
:10967000DD9220D1BD819F27EFCE464CDF90C654AE
:10968000D79284 0F8A30979320BBCE0090A6008497
:10969000 0F8A30A700088C009D26F239D6A28603D7
:1096A0003D04CE98A63A8603BD952B7E95A2CE00AA
:1096B00090CC200808A7005A26FA968881 3F2719DF
:1096C000811F26089689810226028D08CE00918688
:1096D000087E952BC642D79239C6209689850127E8
:1096E0002C64DBD94EEC620C5022702C642BD94F7
:1096F000EEC620BD94EE96A98D07C63ABD94EE96AF
:10970000AA9786BD8E8B16D78EBD8E0DBD94EAD6D8
:109710008E7E94EABD9811B648152B06BD90622442
:109720001399688F648154D2607C50427F37E971C
:109730009881012606C50127E82035813F27169626
:109740008981012606C52027D8204D81022606C51D
:10975000 0227CE2020C50827C89688813F2716F605
```

```
:1097600048l4C52027BB8D408D49BD969C7E96042C
:10977000B648142B0A8D318D3ABD96AE7E9604966E
:109780008920EBD23CE98E5BD96A6BD96AE7E960F
:1097900048D15CE98E820F08D0E8D17BD96AECCB9
:1097A0002A2ABD94FF7E9604DC8ABD962BBD9623A6
:1097B0007E95345F9688271C5C810127175C8103A6
:1097C00027125C813F270D96895C810127065C8109
:1097D000227015CCE98C186033D3A7E96A6C1FF62
:1097E000270FBD819F270A16C4F0C1E02603BD964E
:1097F000797E96048D1B8510260139BD96238D0C2C
:10980000BD9534CE98C4BD96A67E960486077E95F7
:109810040F64818C50226023839B6481539BD94B5
:10982000C1BD96238DE6BD953ECE98D6860CBD95DE
:109830002B7E96048DDBBD9623DCBABD9628BD95A4
:1098400034861097A2BD969CDEA72606CE990F7E81
:1098500095FFDCABBD0CC62FBD94EEDCA78D037E8F
:109860009604BD964BCE009086047E952B4F5249B0
:1098700047202020444553542020202054494D87
:10988000452020202020202044415445202020 15
:10989000202020464342020202053544154555532D
:1098A000204641494C20524353243452434B526B
:1098B0004353474554445253435243524354343E5
:1098C00048505249545820413443B524320454D5231
:1098D00052515341434B2020202020204C4F472001
:1098E0004F4E41434B5458535458454A414E4645B8
:1098F000424D41524150524D41594A554E4A554CA4
:10990000415475345504F43544E4F5644454359A
:109910005441524548E00FF7F40004F5FDDC9DDCBC4
:1099200097CDBD8BC0C644BD8AC38614BD84D6C640
:1099300014D703CE8705DF81CC080C9708D700CC5D
:1099400019AD309DD0B0E8655979DBD86F620F74B
:109950001F0403001F0108083F0403003F0407041D
:109960003F01080BCE99503AEC00DDB8EC02DDBAB0
:10997000C614D703D7DECE00B8BD867EC615D70382
:10998000CE9CDDDFC3CE0080DFA3CE0BB8DF9F7E91
:109990008643B648188504260E866DBD84C9B65820
:1099A000000492BFA7E87FE7F00088605BD84D6C657
:1099B00048BD8AC3BD8C2BB74001CC04FF97A3D709
:1099C000A10EB65800492B037E87FED6A1C1FF2702
:1099D000F10FC10B27D996A52704DEC36E0096A40C
:1099E000273BC101262C9602850226037E9ABC5F86
:1099F000BD9964CE99F9DFC53FDE88DFDFDE8ADFFF
:109A0000E1C604BD9964CE9A0B20EB968897E37E5D
:109A10009AF5C10326037E9B54863F200EC10A2679
:109A2000997300A4C64CBD8AC3208F8E00FFBD84ED
:109A3000C9BD9A8F7E99AFCE008E5F8640B7500029
:109A4000F7600086034A26FDB6580043A700BD9D77
:109A50004686394A26FD08CB108C009E26DDCE00B6
:109A60008ED693E8002B0A088C009E26F4867C2074
:109A7000BACE008E5F96932A02C630D784A60084A1
:109A80003098842606088C009E26F239BD8AC3CE03
:109A900017707E84B0DCDFB3480D2508FC480B93BB
:109AA000DF250139865B208396E1270AB14810251E
:109AB0006B1480F220139864F7E9A2B86159703EF
:109AC000BD9A372611861197303BD9A372608C650CE
:109AD000BD8AC37E9A31CE009DC602A60048484882
```

```
:109AE0007900E27900E17900E07900DF5A26F00997
:109AF0008C008D26E4C654BD938D9ADCDFBD93795E
:109B00008D8DC658BD9A8C8D9FD6E18D38BD819FB5
:109B1000261096E2840F8AE0B14811271486077E4A
:109B20009A2BC65CBD9A8CD6E2C40FC10A24EE8D76
:109B30001496E2BD8E0DB84819840F2705867F7EE6
:109B40009A2B7E99AFBD83DADDC94F5FDDCBBD8B2C
:109B5000BB7E9A8FC654BD9A8C4F5FDDA7BD9379AB
:109B6000CE9B6CDFC386FF97A57E99BAC10A2705F5
:109B7000BD933B20F4DCA7DDDFBD9A95C610BD8AFE
:109B8000C3CE9B897F00A220DAC10A2711D6A2BDCD
:109B90008E08DAA1BD83DADDC9BD8BBB20CB96A2CE
:109BA00097E1BD9AABBD819F2609F64811C40FD739
:109BB000E22035C65CBD8AC3860F97A2F64811C461
:109BC000FBD83DA97C9C640D7CACC3871DDCBBD8B
:109BD0008BBBCE9BD87E9B63C10A27035F20B3D685
:109BE000A2C11025C87E9B1DF64819BD8E08DAE279
:109BF000D7E2C668BD8AC3CE9BFD7E9B63C10A27A0
:109C00000037E99BAC660BD9A8C96028502273DC62E
:109C10008BD9964CE00DFBD9968C60CBD9964CEBD
:109C20000480BBD9968C610BD9964CE00E3BD996824
:109C30005FBD9964CE9C3ADFC53FDC8893DF260682
:109C4000DC8A93E127037E9CDD7E9AF586159703D7
:109C50008D26861197038D20860297C2C61596938E
:109C60002A02C614D703378D1A33C4FBD7038D13CA
:109C70007A00C226E77E9ABCBD9A37260139867CD7
:109C80007E9A2B7F0084CE00E286049786E60056FB
:109C9000861O8D175686208D1296844C81102601D1
:109CA0003997847A008626E70920DE373C97838639
:109CB0003978596932B3224298D7786489A83B70C
:109CC0005000C6115A26FD8648B750008D72CE004E
:109CD000E80926FD8D78270E7A008526DC866F7EC2
:109CE0009A2B8D6A27F738333925418D458649B738
:109CF00050003D86499A83B75000C60A5A26FD8413
:109D0000F7B75000C6615A26FD8A08B75000C6064C
:109D1005A26FD8649B750003D8D25CE03590926A8
:109D2000FD8D2B26C17A008526C120B18D2026AD60
:109D30002OB48648B75000D684BD8E08F76000393D
:109D40008608B750003D4FB75000B76000398640D5
:109D5000BDE2C6035A26FDF65800BDEA96838130BF
:089D60002703D58339C58039C2
:109FF00087FE87FE008087FE80B688BE991487FEA4
```

APPENDIX 2

The following is an Intel Hex memory dump of the computer program for the mobile unit for an MC3870 microcomputer according to the invention.

```
:1F0000001A2805E36F655C675D8FFB201CB570558173F584054C13135E4DA45471903893
:200020001E03A052348117E391052069900542532064B74118517154380011D1B1CE3810711
:200040004253206D9003206FB742E152C2451 9C55538011D1B1CF4C68203C6564719C75790
:2000600076F412EC5C451F551594A64D475D465C2806602806427028O5E36F605C635C6257
:200080005DFF9076D20175E715C7458775A202AB6B718902A63C04C19B203CC5C4E8FF872
:2000A0006241 2E8142101507EFB8406230E8402304CC091025C4ECC20F68202135C70C8D0
:2000C00081FD745802E5504506713681 3CE40284021 2587156F084083718E7940357381068
:2000E00031316506C84AF623C77FD4C94091F252694042902C45C0B00E050C04C19CC5C15
```

```
:20010000626F201E90B090B7F0840AC75772E7940457755803139447636B2007ED5B101647
:20012000504D23095B1016C0504D232A5B1016C0504D23445B1016C0504C236F5B1016C0D6
:200140001325OA82062544B20518047707655C4C211F8418128421626E7FCC7C9202785BCD
:20016000656A70CC840271EBB5909C676F70CC84E73C94E41A9069676E70CE94EDA6910798
:200180000EE81041A905665A01381042905201381042905266676C13FC6591281381206A7087
:2001A000CC84106D4C250E92111F5C1A280642290077A1159108290378A1159104706D5C34
:2001C00090A8706BCC84FA1AA1131572912BA721031F5428066735481FB90EE20156E5C6E43
:2001E0003C9404290077A72103544B4C141324066F5CCC3481FD5C7158201F50485170520C
:200200001B903F676D203F504C15185A21E01259656A4DEC54841428062C6F4C53410B4C41
:2002200052431B1FC282031FCA5A4952656B70CE8402725170CC840271C1514A21FCC15188
:200240007F6768FDE2524C536B604C625E8FFB20445028O5EB2806A1445D455C280678623A
:200260006D134C198203CC5C4E8FF8701950280689F2806843494E9280667626B2A01142060
:20028000555D5D5D778E168FFB5C6875527B535434994FE411851EC141314135074E0B00F96
:2002A00036201C3294EA75524CCC195CD620193394DE7853A00A1F0B25262016940228O561
:2002C000E32900771A280678343428068F50280684E0C3C35321535B10778A250282094326
:2002E00023135342234052421235BCB626D4C198203CC5C4E8FFB3494D22806A144ED94051A
:2003000045EC84042900776D674C605E8FFB626A4D1F94054C1F84184EE194054CE08410BC
:200320007FF322E0ED94DE4CE284054C1F94D6684D235F94D03C8418C3C84312806603C84A9
:20034000A1A3C84253C94BE70656B5E8FFE73582901F9745828O660290203676E70CC9404C6
:20036000280642705D5C909D29050C451381967F656D5C20A05B90261A280642185B6B70B8
:20038000CC841B6E4C5128061F6BFC94075E8FFE6990246F4C526E4C0B4C5390296870CDC1
:2003A00084156E4C1F21375C5128061F6F4E52534C0B425C9010715C6E20305E676D4C1564
:2003C00066685C52532805F6595A202C50280SEB904745B44684A05871F8C0C0500B644C0E
:2003E000B03548E1910A49181F49195939900BE151491824FF4919592B45B446B4A02101F4
:20040000C0C0500B644CB04918940740ACB20590542B0F3584490FC45B446B4A05871F819
:20042000C0C0500B644CB03548E1910A4A181F4A195A3A900BE1514A1824FF4A195A2B4591
:200440008446B4A05471F4C0C0500B644CB0354A18940749CB8205900C2B0F2903D20C8F1E
:20046000DF15810A42E394042806C9900E7EB54B189408280642A11581FA7EB5656F42533C
:200480005C2805976B4B1884026A44EC5C684458EC5C6E4C0B4C5265684C5428062C6E4CC2
:2004A000E1842B411F21375142118C3920F410B4218CC921A4318CC8215900D410B4218CCFA
:2004C00082064318CC82076528O5979OCB65684C5428062C6E4CE1842041OB4218C3920F50
:2004E0004C18C282144C18C3920F43C5C900B4C18C292F84C18C382F32B05E34B1884057086
:20050000SC903120845B50280SEB90546S684C6BFC8421542044SB502805EB28O66790307E
:200520001A694EFC94221A6A70CC941C68CD940728064229007770CC840C4C139402715E38
:20054000FD84F89003684C5420845B502805EB28062C6E4CE1410B4D529403656F4C53280E
:2005600005F62B2B45B446B4A12101C0C0500B644CB00F0FB0EF3594EA0CBFE91591147E3D
:2005800085656E4CE19407CB8104280642694D18FC5C2805E3909D694C546B4418FC5E8F2F
:2005A000FB69445C1C35461F5692140FA07215C7922D03800157B1B152E38426681C77F6BC
:2005C0008417A6811C4B189409595AA11581089010A11581OCA0681C421F90019ODB9OD681
:2005E000786F1C7EB57OB4BOB17C50656A70CE840271EOB5701C6468765D1821028FFB7477
:200600005C676D4C1507750420A5057E15F25781421313135670551C656E4C1F2137517762
:200620000F15571B4051335940F695C1C0828O61844FC940E4C139402715C411F21375190Z5
:20064000F00C082084302805EB2806607456705520C01F94FE72E656B0359F52805E30CA4
:20066000202A9009709006676B4C141524030500FOF1F94FC3094F91C775A70525320175SBB
:20068000203B541C4213C05221635B10718A50451F2526940320185SOB71FOCCCC5C701933
:2006A0001C62687054554DE45312121351E5544314E335153213E5554114E2E4540A251402
:1306C00094E54418544518551C421F9205676C4C15321C96
:1006F000434F50522E2738324D4F544F524F4C419A
:2007000001010201020283010202830283B384010202830283848248484888389
:2007200001020203020303B4020303B40384848502030384038484850384848488485B58649
:200740000102020302030384020303B40384848502030384038484850384858568649
:20076000203030403040485030304048504858586030404850485858604058586B58686B7E9
:20078000010202030203038402030384038484850203038403B4848503849485848585B6E9
:2007A00020303040304040485030404850485858603040404850485858604858586B68687A9
:2007C00020303040304040485030404850485858603040404850485858604858586B68687B9
:2007E00030404050405058604050586058686B704050586058686B70586868786876878849
:000000001FF
```

What is claimed is:

1. A digital voice storage system, in a communications system adapted for voice and data communications over a communications medium, having at least one primary station and a plurality of remote secondary stations with all stations adapted to transmit a command data packet and each remote station having a predetermined station address stored in a station address register, the digital voice storage system comprising:

each primary station having,
 means for providing a command data packet containing a record code and a station address;
 means for providing a voice message and a termination code subsequent to completion of the message,
 means for transmitting said command data packet, voice message and termination code to said secondary stations;

each secondary station having,
 means for generating a record activation signal in response to receiving a command data packet having a record code and a station address corresponding to the station's stored predetermined station address, from a primary station, means for analog to digital converting a voice message transmitted by the primary station and received by the secondary station, and storing the converted message in a digital memory in response to the record activation signal;

means for terminating the analog to digital conversion in response to the termination code.

2. The digital voice storage system of claim 1 wherein the primary station means for providing a command data packet further comprises means for providing a command data packet having a fleet or group address thereby addressing a fleet or group of secondary stations simultaneously.

3. The digital voice storage system of claim 1 wherein the primary station means for providing a command data packet further includes means for providing a command data packet having a recorder condition request command and, means at each secondary station for displaying the total and remaining record capacity of such secondary station if addressed, and wherein the secondary stations further comprise means to transmit total recording capacity and remaining recording capacity of the digital memory of the addressed secondary station in response to receiving the recorder condition request command.

4. The digital voice storage system of claim 3 wherein each secondary station further comprises record means for digitizing and storing in the digital memory a secondary station operator initiated voice message from a microphone in such station.

5. The digital voice storage system of claim 4 wherein each secondary station further comprises means for transmitting a command data packet indicating that a stored voice message is ready for retrieval by a primary station in response to the recorder condition request command.

6. The digital voice storage system of claim 3 wherein each secondary station further comprises means for digital to analog conversion of a digitized message stored in the secondary station digital memory in response to a replay signal, thereby permitting review of a stored message.

7. The digital voice storage system of claim 6 wherein the transmitting means at each secondary station comprises means for transmitting a command data packet indicating the presence in such secondary station digital memory of a stored message transmitted by a primary station but not reviewed.

8. The digital voice storage system of claim 4 wherein the primary station means for providing command data packet further comprises means for providing a command data packet having an erase command, and each secondary station further comprises means for erasing a voice message stored in such secondary station digital memory in response to an erase command from a primary station.

9. The digital voice storage system of claim 6 wherein the primary station means for providing a command data packet further comprises means for providing a command data packet having a message transmit command, and wherein the transmission means at each secondary station further comprises means for transmitting a previously stored microphone entered voice message in response to a message transmit command.

* * * * *